(12) United States Patent
Marshak et al.

(10) Patent No.: US 9,477,407 B1
(45) Date of Patent: Oct. 25, 2016

(54) INTELLIGENT MIGRATION OF A VIRTUAL STORAGE UNIT TO ANOTHER DATA STORAGE SYSTEM

(71) Applicant: EMC Corporation, Hopkinton, MA (US)

(72) Inventors: Marik Marshak, Newton, MA (US); Dan Aharoni, Brookline, MA (US); Adnan Sahin, Needham, MA (US); Arieh Don, Newton, MA (US); Alexandr Veprinsky, Brookline, MA (US); Assaf Natanzon, Tel Aviv (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 105 days.

(21) Appl. No.: 13/930,853

(22) Filed: Jun. 28, 2013

(51) Int. Cl.
*G06F 12/00* (2006.01)
*G06F 3/00* (2006.01)
*G06F 3/06* (2006.01)
*G06F 12/08* (2016.01)

(52) U.S. Cl.
CPC .............. *G06F 3/061* (2013.01); *G06F 3/067* (2013.01); *G06F 3/0647* (2013.01); *G06F 12/08* (2013.01)

(58) Field of Classification Search
CPC ...... G06F 3/061; G06F 3/0647; G06F 3/067; G06F 12/08
See application file for complete search history.

(56) References Cited

U.S. PATENT DOCUMENTS

| | | | |
|---|---|---|---|
| 7,292,969 B1 | 11/2007 | Aharoni et al. | |
| 7,392,360 B1 | 6/2008 | Aharoni et al. | |
| 7,949,637 B1 | 5/2011 | Burke | |
| 8,370,592 B1 * | 2/2013 | Specht et al. | 711/162 |
| 8,838,931 B1 | 9/2014 | Marshak et al. | |
| 8,856,483 B1 * | 10/2014 | Paterson-Jones | G06F 12/023 711/170 |
| 2007/0271434 A1 * | 11/2007 | Kawamura et al. | 711/165 |
| 2008/0216086 A1 * | 9/2008 | Tanaka | G06F 3/061 718/105 |
| 2009/0070541 A1 | 3/2009 | Yochai | |
| 2013/0080703 A1 * | 3/2013 | Kumagai et al. | 711/117 |

OTHER PUBLICATIONS

U.S. Appl. No. 13/331,010, filed Dec. 20, 2011, Sean C. Dolan et al.
U.S. Appl. No. 13/925,216, filed Jun. 24, 2013, James L. Davidson et al.
Dan Aharoni et al., "Quantifying Utilization of a Data Storage System by a Virtual Storage Unit", U.S. Appl. No. 13/931,453, filed Jun. 28, 2013.

* cited by examiner

*Primary Examiner* — Aracelis Ruiz
(74) *Attorney, Agent, or Firm* — Krishnendu Gupta; Daniel P. McLoughlin

(57) ABSTRACT

A virtual storage unit from one data storage system may be migrated to another data storage system. Utilization impacts on system resources by one or more virtual storage units on multiple data storage systems may be quantified, for each data storage system as a whole, or for a functional component of each data storage system. Based on these quantifications, multiple "what-if" scenarios may be considered to determine the consequences of migrating one or more virtual storage units from one of the data storage systems to another one of the data storage systems. If it is determined that a virtual storage unit is to be migrated, a live migration may be performed such that one or more hosts maintain access to the data of the virtual storage unit while the virtual storage unit is being migrated.

20 Claims, 21 Drawing Sheets

ALLOCATION
MAP FOR TDI
760

| CHUNK ID (760a) | LV, STARTING OFFSET (760b) | STORAGE POOL (760c) |
|---|---|---|
| C1 (762) | LV A, 100 | POOL 1, TIER A |
| C2 (764) | LV B, 200 | POOL 2, TIER B |
| ⋮ | ⋮ | ⋮ |

| 1511 VIRTUAL STORAGE UNIT | 1504 FA WORKLOAD | 1506 BE WORKLOAD | 1508 PSU WORKLOAD | 1510 TOTAL WORKLOAD | 1512 OTHER INFORMATION |
|---|---|---|---|---|---|
| EMAIL | 3097.29 | 561.72 | 561.72 | 4220.73 | |
| ACCOUNTS RECEIVABLE | 6.21 | 3.91 | 3.91 | 14.03 | |
| PURCHASING | 1.63 | 1.07 | 1.07 | 4.33 | |
| AGREEMENTS REPOSITORY | 0.00 | 0.00 | 0.00 | 0.00 | |

| HOST PORT (1702) | VIRTUAL STORAGE UNITS (1704) | OTHER INFORMATION (1706) |
|---|---|---|
| 1618a | 1604a, 1604x | |
| 1618b | 1604a, 1604b | |
| 1618d | 1604y | |

1708 → row 1
1710 → row 2
1712 → row 3

FIG. 17

INTELLIGENT MIGRATION OF A VIRTUAL STORAGE UNIT TO ANOTHER DATA STORAGE SYSTEM

CROSS-REFERENCE TO RELATED APPLICATION

This patent application is related to co-pending U.S. patent application Ser. No. 13/931,453, filed concurrently on Jun. 28, 2013, titled "Quantifying Utilization Of A Data Storage System By A Virtual Storage Unit" by Aharoni, et al.

BACKGROUND

In modern computer systems, vast amounts of data may need to be accessed by hundreds, thousands or even million of different entities, including persons and groups (e.g., organizations) of persons. Accordingly, computer systems have been developed in which data is stored on multiple physical storage units (PSUs), i.e., physical storage devices including, but not limited to magnetic tape, disk drives, solid state storage devices (e.g., flash drives) or portions thereof. Typically, these physical storage devices are grouped together as part of one or more data storage systems (e.g., storage arrays), for example, data storage systems made available by EMC Corporation, headquartered in Hopkinton Mass. ("EMC").

Entities typically access the data on such data storage systems via one or more host systems for which communication paths have been established over one or more communication media (e.g., as part of a network) between ports of the host systems and ports of the data storage systems. Through the host systems, data of the data storage system may be accessed and modified using I/O operations, for example, read and write operations. To this end, data storage systems may provide storage services to host systems. Data storage systems may include PSUs, which typically are nonvolatile memory on which data is persisted even if power is lost, and cache memory (i.e., caches), which typically is volatile memory in which data is temporarily stored for efficiency purposes. Typically, data can be read from, and written to, cache faster than it can be from the non-volatile PSUs. Data storage systems typically include front-end logic and functional components to handle the exchange of data between data storage system ports and cache, and back-end logic and functional components to handle data exchanges between the cache and the PSUs.

Host systems typically do not address the PSUs of the data storage system directly, but rather, access the PSUs by addressing virtual (i.e., logical) storage units (VSUs), for example, logical volumes (LVs), thin devices and storage groups, which hide the details of actual physical storage from the host. A VSU may or may not correspond one-to-one to a PSU.

As data storage capacity, computation and flexibility demands continue to grow at a rapid rate, so does the challenge of maintaining acceptable levels of data storage system performance.

SUMMARY

This Summary provides an illustrative context for aspects of the invention, in a simplified form. It is not intended to be used to determine the scope of the claimed subject matter. Aspects of the invention are described more fully below in the Detailed Description.

In some embodiments of the invention, a system includes a first data storage system having a first plurality of virtual storage units, a second storage unit having a second plurality of virtual storage units, and at least one host device connected to the first data storage system and the second data storage system. A performance of the first data storage system is quantified, and a performance of the second data storage system is quantified. For at least a first virtual storage unit of the first plurality of virtual storage units, an impact on performance of the first data storage system by the at least first virtual storage unit is quantified. Further, it is determined whether to migrate data of the at least first virtual storage unit from the first data storage system to a second data storage system based at least in part on the quantified performance of the first data storage system, the quantified performance of the second data storage system; and the quantified impact of the at least first virtual storage unit. A migration of the data of the first virtual storage unit from the first data storage system to the second data storage system is performed, wherein, concurrently to performance of the migration, the at least one host device maintains access to data of the first virtual storage unit.

In some aspects of these embodiments, the at least one host device has at least a first host device port for communicating with at least the first data storage system, and the first data storage system includes at least a first data storage system port to communicate with at least the first host device port. Further, a first data structure associated with at least the first storage port includes an entry mapping at least the first host device port to at least the first virtual storage unit thereby enabling communication between at least the first host device port and the first virtual storage unit. The second data storage system includes at least a second data storage system port to communicate with at least the first host device port, and a second data structure is associated with at least the second storage port. The entry in the first data structure is configured so that communication between the first virtual storage unit and at least the first host device port is disabled, and an entry of the second data structure is configured to enable communication between at least the first host device port and the migrated first virtual storage unit.

In some aspects of these embodiments, the system includes at least a first switch in a communication path between the first data storage system, the second data storage system and the at least first host device, the first switch including a plurality of host ports for communicating with a plurality of host device ports and a plurality of storage ports for communicating with a plurality of storage device ports of the first data storage system and the second data storage system. The switch is configured so that communications are enabled between each of the plurality of host ports and each of the plurality of storage ports, thereby enabling communications between each of the plurality host ports and each of the plurality of storage ports.

In some aspects of these embodiments, quantifying the impact on performance includes, for each of the first plurality of virtual storage units, quantifying the impact on performance of the data storage system by the virtual storage unit, and determining whether to migrate includes selecting the at least first virtual storage unit from among the first plurality of virtual storage units for which to migrate the data to the second data storage system based at least in part on the quantified impacts.

In some aspects of these embodiments, the second data storage system has at least a second virtual storage unit. Further, for at least the second virtual storage unit, an impact on performance of the second data storage system by the at least second virtual storage unit is quantified, and determining whether to migrate includes determining whether to migrate data of the at least first virtual storage unit from the first data storage system to the second data storage system based at least in part on the quantified impact of the at least second virtual storage unit.

In some aspects of these embodiments, quantifying a performance of the first VSU includes quantifying a performance of the first VSU during a plurality of temporal intervals over a temporal period to produce interval performance values, and performing a migration includes performing the migration during a particular temporal interval based at least in part on the interval performance values.

In some aspects of these embodiments, the first virtual storage unit has a unique identifier, and performing the migration includes: creating a second virtual storage unit on the second data storage system; assigning a same unique identifier to the second virtual storage unit, enabling the at least one host device to communicate concurrently with the first virtual storage unit and the second virtual storage unit; placing the second virtual storage unit into a stalled-active mode in which responses to I/O operation requests received from a host system are delayed for up to a particular amount of time; changing a mode of the first virtual storage unit from active mode, in which the first virtual storage unit is able to perform I/O operations, to passive mode in which the first virtual storage unit is not able to perform I/O operations; changing a mode of the second virtual storage unit from the stalled active mode to an active mode in which the first virtual storage unit is able to perform I/O operations; and copying the data from the first virtual storage unit to the second virtual storage unit.

In some aspects of these embodiments, the first data storage system includes a plurality of functional components, and quantifying the impact of at least the first virtual storage unit includes: for at least one of the plurality of functional components, for a plurality of types of storage I/O operations, counting a number of occurrences of the storage I/O operation type over a period of time to produce an I/O operation type count value for the at least first virtual storage unit for the functional component; and combining the I/O operation type count values.

In some embodiments of the invention, a system is configured with logic to perform one or more of the foregoing acts. Such logic may be embodied in one or more discrete modules of the system.

In some embodiments of the invention, a computer-readable storage device is provided, encoded with computer-executable instructions that, as a result of being executed by a computer, control the computer to perform one or more of the foregoing acts.

Other advantages, novel features, and objects of the invention, and aspects and embodiments thereof, will become apparent from the following detailed description of the invention, including aspects and embodiments thereof, when considered in conjunction with the accompanying drawings, which are schematic and are not intended to be drawn to scale. In the figures, each identical or nearly identical component that is illustrated in various figures is represented by a single numeral. For purposes of clarity, not every component is labeled in every figure, nor is every component of each embodiment or aspect of the invention shown where illustration is not necessary to allow those of ordinary skill in the art to understand the invention.

BRIEF DESCRIPTION OF THE DRAWINGS

Features and advantages of the present invention will become more apparent from the following detailed description of exemplary embodiments thereof taken in conjunction with the accompanying drawings in which:

FIGS. 8A and 8B are examples illustrating thin devices and associated structures that may be used in an embodiment in accordance with techniques herein;

FIG. 15 illustrates an example of how utilization information may be displayed to a user in accordance with some embodiments of the invention;

FIG. 17 illustrates an example of a masking table that may be used in accordance with some embodiments of the invention.

DETAILED DESCRIPTION

Figure 1:
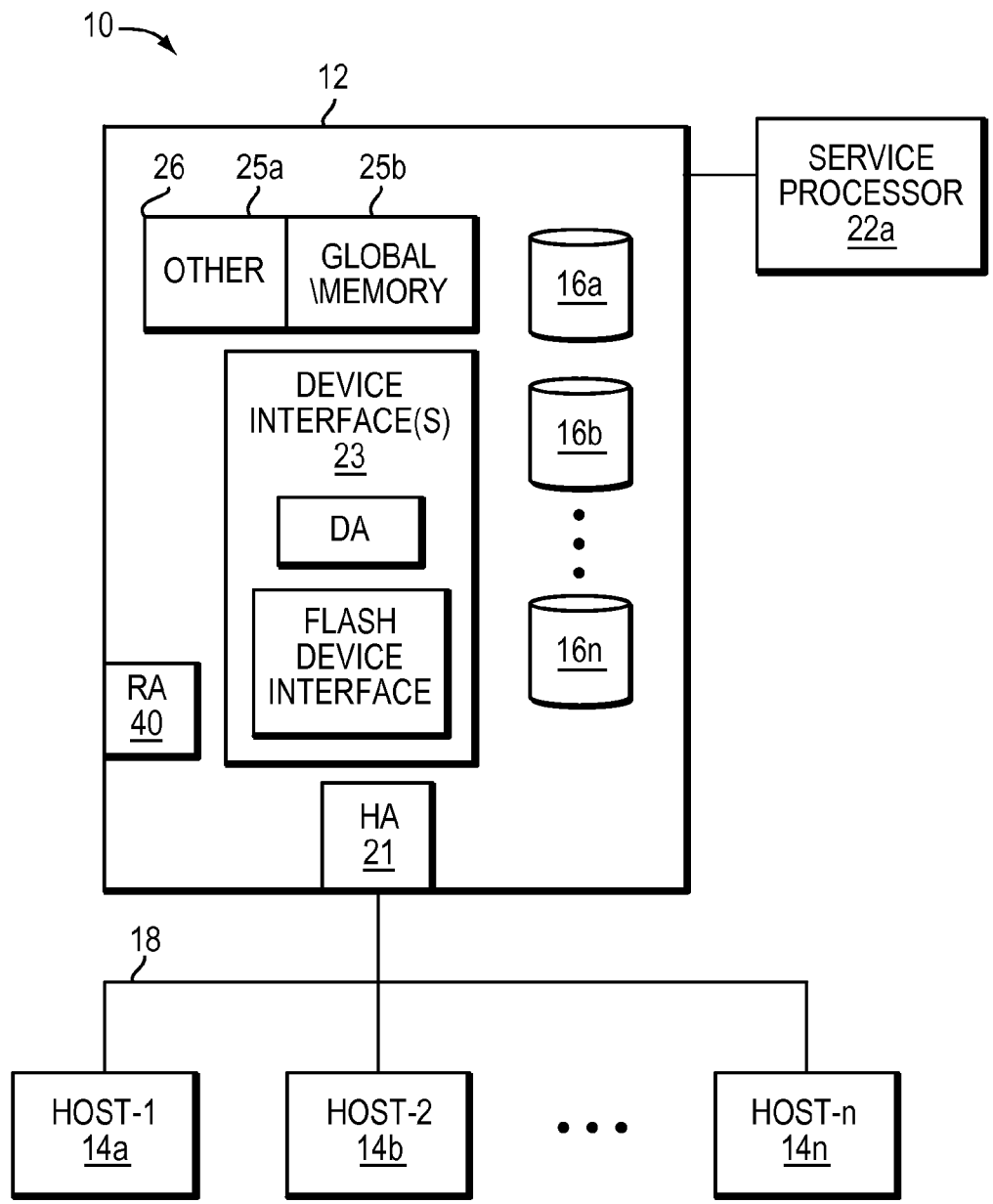
FIG. 1 is an example of an embodiment of a system that may utilize the techniques described herein.

To meet the challenge of maintaining acceptable levels of data storage system performance, e.g., for one or more applications or entities of a computer system, storage may be re-allocated between the applications or entities, and/or additional storage capacity may be added to the computer system (e.g., additional PSUs may be added to a data storage system, or an additional data storage system altogether may be added to the computer system), and data for one or more applications or entities may be migrated to the newly added storage. As the data storage capacity, computation and flexibility demands continue to grow at a rapid rate, so does the frequency with which data storage needs to be reallocated and/or added with resulting data migration.

To date, solutions for determining when it is time to reallocate or add storage, or migrate data, what data to move, and where and when to move it, have been too manual, too subjective, and/or have not reliably established how individual VSUs impact performance of specific functional components of the storage or the data storage system as a whole.

Described herein are mechanisms and techniques for intelligently migrating a VSU from one data storage system to another data storage system. As used herein, a "virtual storage unit" or a "VSU" is a virtual (i.e., logical) unit of storage, including, but not limited to a logical volume, a logical/virtual device (e.g., a thin device), or a group of logical volumes or logical/virtual devices, such as a storage (i.e., device) group. In some embodiments, for multiple data storage systems, the utilization of system resources by one or more (e.g., some or all) of the VSUs on the data storage systems may be quantified. As used herein, a "utilization score" is a value representing such quantification. Such a determination may be made for a data storage system as a whole, or for a functional component of a data storage system. As used herein, a "functional component" of a data storage system is a discrete component of the data storage system that performs one or more functions for the system, i.e., performs work. A functional component may be a discrete hardware, firmware or software component of the system, or any suitable combination thereof. A utilization score may be determined for each VSU for one or more functional components of the data storage system, for example, a front-end adapter ("FA"), back-end adapter or interface (e.g., disk adapter or flash drive interface) ("BE") or PSU (e.g., disk or flash drive). As used herein, a "component utilization score" is a score determined for a functional component of a data storage system.

Based on the foregoing quantifications, multiple "what-if" scenarios may be considered to determine the consequences of migrating one or more VSUs from one of the data storage systems to another one of the data storage systems. That is, for one more VSUs of a source system, it may be estimated what the impact would be on the performance or workload of the source system and one or more target systems of migrating the one or more VSUs from the source system to the one or more target systems. For example, these estimated impacts may be compared against predefined performance or workload criteria or thresholds of one or more data storage systems, and predefined rules may be applied to determine whether to migrate one or more VSUs, and to which of the other data storage systems, based on the results of such comparisons. Such criteria, thresholds and rules may be encoded as logic.

If it is determined that a VSU is to be migrated, a live migration may be performed such that one or more hosts maintain access to the data of the VSU while the VSU is being migrated. For example, such live migration may be achieved by using spoofing techniques and manipulating the states (e.g., passive, active, and stalled-active) of the VSU being migrated, as will be described in more detail below.

In some embodiments, performance of the overall system or functional component thereof may be determined for a plurality of temporal intervals (e.g., X minutes) within a temporal period (e.g., Y hours or days), and the impact of one or more VSUs on performance (e.g., system and/or component utility scores) may be determined for a plurality of temporal intervals within a temporal period. A migration for one or more VSUs may be scheduled based, at least in part, on the utility scores and performance values determined within particular periods. For example, the migration may be scheduled during a specific time of day, week or month that is anticipated as having low workload on the source and/or target data storage system. For example, the migration may be scheduled during a specific time of day, week or month for which the source and/or target data storage systems are anticipated as having low workload based on the quantified performances of the source and target data storage systems during previously measured temporal intervals.

In some embodiments, a switch may be situated between a host device port and ports of the source and target data storage systems. Prior to migration of the VSU, the switch and one or more ports of the source system corresponding to the VSU may be configured such that communication between the VSU and the host device port is enabled. For example, the switch may be zoned to allow such communication—i.e., to map the host device port to the port of VSU, and one or more masking tables of the source system, each corresponding to storage port, may include an entry for the VSU that allows communication between the VSU and the host device port. Further, prior to migration of the VSU, the switch and/or a port of the target system corresponding to the VSU may be configured such that communication between the VSU and the host device port is not enabled. For example, because the VSU resides on the source device, no masking tables of the target system may include an entry for the VSU. Further, the switch also may not be zoned to connect one or more ports of the second data storage system to the host device port. As a result of the migration, communication between the host device port and one or more ports of the source data storage system may be disabled, and communication between the host device port and one or more ports of the source data storage system may be enabled (in part), by modifying the zoning/mapping scheme of a switch. However, there is often much administrative overhead and delay in modifying the zoning/mapping scheme of a switch. Accordingly, in some embodiments of the invention, to avoid such overhead and delay, the switch may be configured such that all host device ports connected to the switch can communicate with all storage ports connected to the switch; and the communication paths necessitated by the migration may be enabled using the masking tables of the source and target data storage systems, or other data structures.

It may be desirable to mask ports in the manner described above to maintain a reduced number of communication paths between VSUs, storage ports and host ports, thereby reducing perceived size of the SAN from the perspective of one more functional components, and the necessary maintenance and computation required for the SAN, for example, in the event of a failure of one or more connections between host ports and storage ports.

EXAMPLES

Referring to FIG. 1, shown is an example of an embodiment of a system that may be used in connection with performing the techniques described herein. The system 10 includes a data storage system 12 connected to host systems 14a-14n through one or more communication media 18. In this embodiment of the computer system 10, the n hosts 14a-14n may access the data storage system 12, for example, in performing input/output (I/O) operations or data requests. The one or more communication media 18 may include any of one or more of a variety of networks or other type of communication connections as known to those skilled in the art. The one or more communication media 18 may include any of: a network connection, bus, and/or other type of data link, such as a hardwire or other connections known in the art. For example, the one or more communication media 18 may include any of: the Internet, an intranet, a network (including a Storage Area Network (SAN)) or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the one or more communication media 18 by any one of a variety of connections as may be provided and supported in accordance with the type of one or more communication media 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 12 are described herein in more detail, and may vary with each particular embodiment. Each of the host systems 14a-14n and data storage system 12 may all be located at the same physical site, or, alternatively, may also be located in different physical locations. The one or more communication media that may be used to provide the different types of connections between the host computer systems and the data storage system of the system 10 may use a variety of different communication protocols such as SCSI, Fibre Channel, iSCSI, and the like. Some or all of the connections by which the hosts and data storage system may be connected to the one or more communication media may pass through other communication devices, such as switching equipment that may exist such as a phone line, a repeater, a multiplexer or even a satellite. For example, while not shown in FIG. 1, system 10 may include a switch connected between host system 14 and data storage system 12 such, for example, a Connectrix® switch made available from EMC. In some embodiments, system 10 may include switch 1610 described below in connection with FIG. 16.

Each of the host computer systems may perform different types of data operations in accordance with different types of tasks. In the embodiment of FIG. 1, any one of the host systems 14a-14n may issue a data request to the data storage system 12 to perform a data operation. For example, an application executing on one of the host systems 14a-14n may perform a read or write operation resulting in one or more data requests to the data storage system 12.

It should be noted that although element 12 is illustrated as a single data storage system, such as a single data storage array, element 12 may also represent, for example, multiple data storage arrays alone, or in combination with, other data storage devices, systems, appliances, and/or components having suitable connectivity, such as in a SAN, in an embodiment using the techniques herein. It should also be noted that an embodiment may include data storage arrays or other components from one or more vendors. In subsequent examples illustrating the techniques herein, reference may be made to a single data storage array by a vendor, such as by EMC Corporation of Hopkinton, Mass. However, as will be appreciated by those skilled in the art, the techniques herein are applicable for use with other data storage arrays by other vendors and with components other than those described herein for purposes of example.

The data storage system 12 may be a data storage array including a plurality of data storage devices 16a-16n. The data storage devices 16a-16n may include one or more types of data storage devices such as, for example, one or more disk drives and/or one or more solid state drives (SSDs). An SSD is a physical data storage device that uses solid-state memory to store persistent data. An SSD using SRAM or DRAM, rather than flash memory, may also be referred to as a RAM drive. SSD may refer to solid state electronics devices as distinguished from electromechanical devices, such as hard drives, having moving parts. Flash devices or flash memory-based SSDs are one type of SSD that contains no moving parts. As described in more detail in following paragraphs, the techniques herein may be used in an embodiment in which one or more of the devices 16a-16n are flash drives. More generally, the techniques herein may also be used with any type of SSD although the following paragraphs may make reference to a particular type such as a flash device or flash memory device.

The data storage array may also include different types of adapters or directors, such as an HA 21 (host adapter), RA 40 (remote adapter), and/or device interface 23. The term "HA" is used herein interchangeably with the term "FA," and the term "device interface" is used herein interchangeably with the term "BE." Each of the adapters may be implemented using hardware including a processor with local memory with code stored thereon for execution in connection with performing different operations. The HAs may be used to manage communications and data operations between one or more host systems and the global memory (GM). In an embodiment, the HA may be a Fibre Channel Adapter or other adapter which facilitates host communication. The HA 21 may be characterized as a front-end component of the data storage system which receives a request from the host. The data storage array may include one or more RAs that may be used, for example, to facilitate communications between data storage arrays. The data storage array may also include one or more device interfaces 23 for facilitating data transfers to/from the data storage devices 16a-16n. The data storage interfaces 23 may include device interface modules, for example, one or more disk adapters (DAs) (e.g., disk controllers), adapters used to interface with the flash drives, and the like. The DAs may also be characterized as back-end components of the data storage system which interface with the physical data storage devices.

One or more internal logical communication paths may exist between the device interfaces 23, the RAs 40, the HAs 21, and the memory 26. An embodiment, for example, may use one or more internal busses and/or communication modules. For example, the global memory portion 25b may be used to facilitate data transfers and other communications between the device interfaces, HAs and/or RAs in a data storage array. In one embodiment, the device interfaces 23 may perform data operations using a cache that may be included in the global memory 25b, for example, when communicating with other device interfaces and other components of the data storage array. The other portion 25a is that portion of memory that may be used in connection with other designations that may vary in accordance with each embodiment.

The particular data storage system as described in this embodiment, or a particular device thereof, such as a disk or particular aspects of a flash device, should not be construed as a limitation. Other types of commercially available data storage systems, as well as processors and hardware controlling access to these particular devices, may also be included in an embodiment.

Host systems provide data and access control information through channels to the data storage systems, and the data storage systems also may provide data to the host systems through the channels. The host systems do not address the drives or devices 16a-16n of the data storage systems directly, but rather access to data may be provided to one or more host systems from what the host systems view as a plurality of logical devices or logical volumes (LVs). The LVs may or may not correspond to the actual physical devices or drives 16a-16n. For example, one or more LVs may reside on a single physical storage device or multiple physical storage devices. Data in a single data storage system, such as a single data storage array, may be accessed by multiple hosts allowing the hosts to share the data residing therein. The HAs may be used in connection with communications between a data storage array and a host system. The RAs may be used in facilitating communications between two data storage arrays. The DAs may be one type of device interface used in connection with facilitating data transfers to/from the associated disk drive(s) and LV(s) residing thereon. A flash device interface may be another type of device interface used in connection with facilitating data transfers to/from the associated flash devices and LV(s) residing thereon. It should be noted that an embodiment may use the same or a different device interface for one or more different types of devices than as described herein.

The device interface, such as a DA, performs I/O operations on a drive 16a-16n. In the following description, data residing on an LV may be accessed by the device interface following a data request in connection with I/O operations that other directors originate. Data may be accessed by LV in which a single device interface manages data requests in connection with the different one or more LVs that may reside on a drive 16a-16n. For example, a device interface may be a DA that accomplishes the foregoing by creating job records for the different LVs associated with a particular device. These different job records may be associated with the different LVs in a data structure stored and managed by each device interface.

Also shown in FIG. 1 is a service processor 22a that may be used to manage and monitor the system 12. In one embodiment, the service processor 22a may be used in collecting performance data, for example, regarding the I/O performance in connection with data storage system 12. This performance data may relate to, for example, performance measurements in connection with a data request as may be made from the different host computer systems 14a 14n. This performance data may be gathered and stored in a storage area. Additional detail regarding the service processor 22a is described in following paragraphs.

It should be noted that a service processor 22a may exist external to the data storage system 12 and may communicate with the data storage system 12 using any one of a variety of communication connections. In one embodiment, the service processor 22a may communicate with the data storage system 12 through three different connections, a serial port, a parallel port and using a network interface card, for example, with an Ethernet connection. Using the Ethernet connection, for example, a service processor may communicate directly with DAs and HAs within the data storage system 12.

Figure 2:
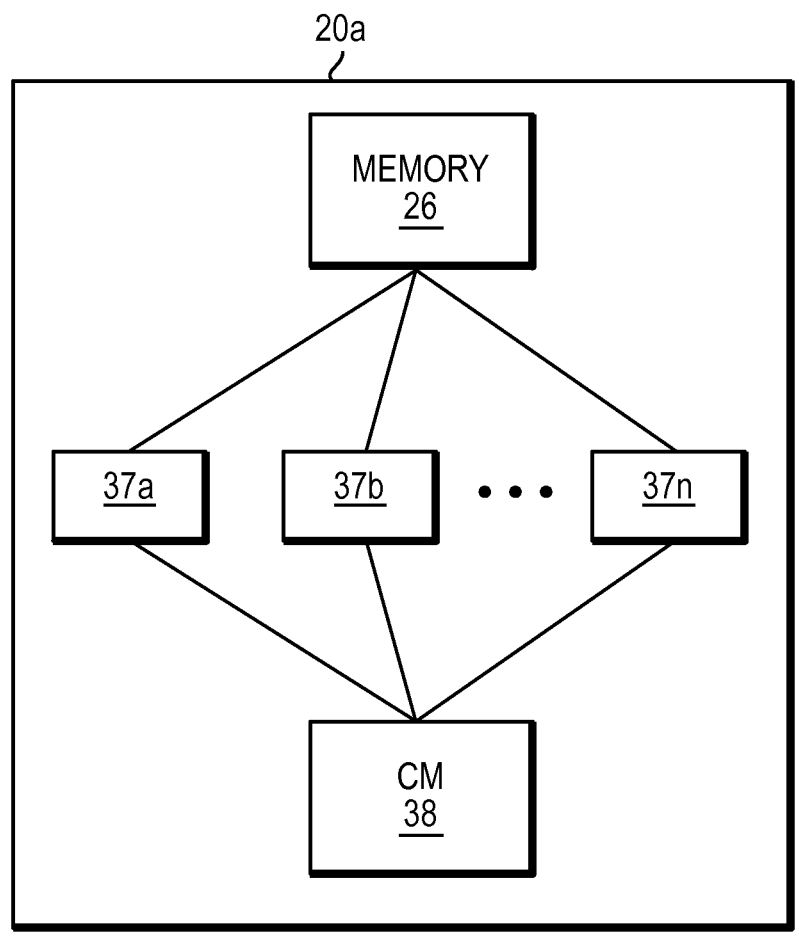
FIG. 2 is a representation of the logical internal communications between the directors and memory included in one embodiment of a data storage system of FIG. 1.

Referring to FIG. 2, shown is a representation of the logical internal communications between the directors and memory included in a data storage system. Included in FIG. 2 is a plurality of directors 37a-37n coupled to the memory 26. Each of the directors 37a-37n represents one of the HAs, RAs, or device interfaces that may be included in a data storage system. In an embodiment disclosed herein, there may be up to sixteen directors coupled to the memory 26. Other embodiments may allow a maximum number of directors other than sixteen as just described and the maximum number may vary with each embodiment.

The representation of FIG. 2 also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

With reference back to FIG. 1, components of the data storage system may communicate using GM 25b. For example, in connection with a write operation, an embodiment may first store the data in cache included in a portion of GM 25b, mark the cache slot including the write operation data as write pending (WP), and then later de-stage the WP data from cache to one of the devices 16a-16n. In connection with returning data to a host from one of the devices as part of a read operation, the data may be copied from the device by the appropriate device interface, such as a DA servicing the device. The device interface may copy the data read into a cache slot included in GM which is, in turn, communicated to the appropriate HA in communication with the host.

As described above, the data storage system 12 may be a data storage array including a plurality of data storage devices 16a-16n in which one or more of the devices 16a-16n are flash memory devices employing one or more different flash memory technologies. In one embodiment, the data storage system 12 may be a Symmetrix® DMX™ or VMAX® data storage array by EMC Corporation of Hopkinton, Mass. In the foregoing data storage array, the data storage devices 16a-16n may include a combination of disk devices and flash devices in which the flash devices may appear as standard Fibre Channel (FC) drives to the various software tools used in connection with the data storage array. The flash devices may be constructed using nonvolatile semiconductor NAND flash memory. The flash devices may include one or more SLC (single level cell) devices and/or MLC (multi level cell) devices.

It should be noted that the techniques herein may be used in connection with flash devices comprising what may be characterized as enterprise-grade or enterprise-class flash drives (EFDs) with an expected lifetime (e.g., as measured in an amount of actual elapsed time such as a number of years, months, and/or days) based on a number of guaranteed write cycles, or program cycles, and a rate or frequency at which the writes are performed. Thus, a flash device may be expected to have a usage measured in calendar or wall clock elapsed time based on the amount of time it takes to perform the number of guaranteed write cycles. The techniques herein may also be used with other flash devices, more generally referred to as non-enterprise class flash devices, which, when performing writes at a same rate as for enterprise class drives, may have a lower expected lifetime based on a lower number of guaranteed write cycles.

The techniques herein may be generally used in connection with any type of flash device, or more generally, any SSD technology. The flash device may be, for example, a flash device which is a NAND gate flash device, NOR gate flash device, flash device that uses SLC or MLC technology, and the like, as known in the art. In one embodiment, the one or more flash devices may include MLC flash memory devices although an embodiment may utilize MLC, alone or in combination with, other types of flash memory devices or other suitable memory and data storage technologies. More generally, the techniques herein may be used in connection with other SSD technologies although particular flash memory technologies may be described herein for purposes of illustration.

An embodiment in accordance with techniques herein may have one or more defined storage tiers. Each tier may generally include physical storage devices or drives having one or more attributes associated with a definition for that tier. For example, one embodiment may provide a tier definition based on a set of one or more attributes. The attributes may include any one or more of a storage type or storage technology, a type of data protection, device performance characteristic(s), storage capacity, and the like. The storage type or technology may specify whether a physical storage device is an SSD drive (such as a flash drive), a particular type of SSD drive (such using flash or a form of RAM), a type of magnetic disk or other non-SSD drive (such as an FC disk drive, a SATA (Serial Advanced Technology Attachment) drive), and the like. Data protection may specify a type or level of data storage protection such, for example, as a particular RAID level (e.g., RAID1, RAID-5 3+1, RAIDS 7+1, and the like). Performance characteristics may relate to different performance aspects of the physical storage devices of a particular type or technology. For example, there may be multiple types of FC disk drives based on the RPM characteristics of the FC disk drives (e.g., 10K RPM FC drives and 15K RPM FC drives) and FC disk drives having different RPM characteristics may be included in different storage tiers. Storage capacity may specify the amount of data, such as in bytes, that may be stored on the drives. An embodiment may allow a user to define one or more such storage tiers. For example, an embodiment in accordance with techniques herein may define two storage tiers including a first tier of all SSD drives and a second tier of all non-SSD drives. As another example, an embodiment in accordance with techniques herein may define three storage tiers including a first tier of all SSD drives which are flash drives, a second tier of all FC drives, and a third tier of all SATA drives. The foregoing are some examples of tier definitions and other tier definitions may be specified in accordance with techniques herein.

Figure 3:
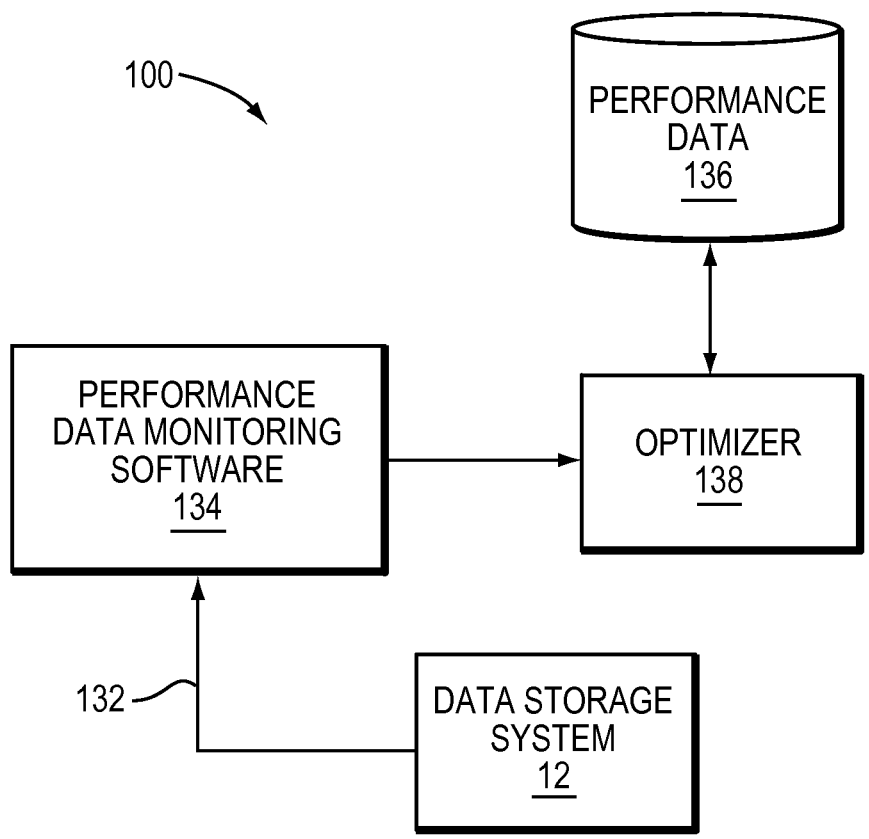
FIG. 3 is an example representing components that may be included in a service processor in an embodiment in accordance with techniques herein.

Referring to FIG. 3, shown is an example 100 of software that may be included in a service processor such as 22a. It should be noted that the service processor may be any one of a variety of commercially available processors, such as an Intel-based processor, and the like. Although what is described herein shows details of software that may reside in the service processor 22a, all or portions of the illustrated components may also reside elsewhere such as, for example, on any of the host systems 14a-14n.

Included in the service processor 22a is performance data monitoring software 134 which gathers performance data about the data storage system 12 through the connection 132. The performance data monitoring software 134 gathers and stores performance data and forwards this to the optimizer 138 which further stores the data in the performance data file 136. This performance data 136 may also serve as an input to the optimizer 138 which attempts to enhance the performance of I/O operations, such as those I/O operations associated with data storage devices 16a-16n of the system 12. The optimizer 138 may take into consideration various types of parameters and performance data 136 in an attempt to optimize particular metrics associated with performance of the data storage system 12. The performance data 136 may be used by the optimizer to determine metrics described and used in connection with techniques herein. The optimizer may access the performance data, for example, collected for a plurality of LVs when performing a data storage optimization. The performance data 136 may be used in determining a workload for one or more physical devices, logical devices or volumes (LVs) serving as data devices, thin devices (described in more detail elsewhere herein) or other virtually provisioned devices, portions of thin devices, and the like. The workload may also be a measurement or level of "how busy" a device is, for example, in terms of I/O operations (e.g., I/O throughput such as number of I/Os/second, response time (RT), and the like).

The response time for a storage device or volume may be based on a response time associated with the storage device or volume for a period of time. The response time may be based on read and write operations directed to the storage device or volume. Response time represents the amount of time it takes the data storage system to complete an I/O request (e.g., a read or write request). Response time may be characterized as including two components: service time and wait time. Service time is the actual amount of time spent servicing or completing an I/O request after receiving the request from a host via an HA 21, or after the data storage system 12 generates the I/O request internally. The wait time is the amount of time the I/O request spends waiting in line or queue waiting for service (e.g., prior to executing the I/O operation).

It should be noted that the operations of read and write with respect to an LV, thin device, and the like, may be viewed as read and write requests or commands from the DA 23, controller or other backend physical device interface. Thus, these operations may also be characterized as a number of operations with respect to the physical storage device (e.g., number of physical device reads, writes, and the like, based on physical device accesses). This is in contrast to observing or counting a number of particular types of I/O requests (e.g., reads or writes) as issued from the host and received by a front-end component such as an HA 21. To illustrate, a host read request may not result in a read request or command issued to the DA if there is a cache hit and the requested data is in cache. The host read request results in a read request or command issued to the DA 23 to retrieve data from the physical drive only if there is a read miss. Furthermore, when writing data of a received host I/O request to the physical device, the host write request may result in multiple reads and/or writes by the DA 23 in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an HA 21.

The optimizer 138 may perform processing of the techniques herein set forth in following paragraphs to determine how to allocate or partition physical storage in a multi-tiered environment for use by multiple applications. The optimizer 138 may also perform other processing such as, for example, to determine what particular portions of thin devices to store on physical devices of a particular tier, evaluate when to migrate or move data between physical drives of different tiers, and the like. It should be noted that the optimizer 138 may generally represent one or more components that perform processing as described herein as well as one or more other optimizations and other processing that may be performed in an embodiment.

Although not illustrated in FIG. 3, software 100 may include one or more of the following, each of which may be part of a discrete software module and/or integrated with one or more of the following: performance logic to determine performance of a system or component thereof, for example, as described below in relation to act 1302; quantification logic configured to quantify utilization by VSU of a storage system and/or one more components thereof, for example, as described below in more detail in relation to act 1304 or method 1400; display logic to display utilization information, for example, as described below in more detail in relation to act 1306; what-if logic to consider what-if scenarios, for example, as described below in more detail in relation to act 1308; migration logic to control a migration, for example, as described in more detail below in relation to act 1310 and migration control server 1650; and masking logic to perform masking of ports and VSUs, for example, as described below in relation to act 1312 and FIGS. 14 and 15. One or more of the foregoing logic elements, or portions thereof, may be implemented as part of any of: service processor 22a, optimizer 138, performance data software 134, migration control server 1650; other system components, or any suitable combination of the foregoing.

Described in the following paragraphs are techniques that may be performed to determine promotion and demotion thresholds (described below in more detail) used in determining what data portions of thin devices to store on physical devices of a particular tier in a multi-tiered storage environment. Such data portions of a thin device may be automatically placed in a storage tier where the techniques herein have determined the storage tier is best to service that data in order to improve data storage system performance. The data portions may also be automatically relocated or migrated to a different storage tier as the work load and observed performance characteristics for the data portions change over time. In accordance with techniques herein, analysis of performance data for data portions of thin devices may be performed in order to determine whether particular data portions should have their data contents stored on physical devices located in a particular storage tier. The techniques herein may take into account how "busy" the data portions are in combination with defined capacity limits and defined performance limits (e.g., such as I/O throughput or I/Os per unit of time, response time, utilization, and the like) associated with a storage tier in order to evaluate which data to store on drives of the storage tier. The foregoing defined capacity limits and performance limits may be used as criteria to determine promotion and demotion thresholds based on projected or modeled I/O workload of a storage tier. Different sets of performance limits, also referred to as comfort performance zones or performance zones, may be evaluated in combination with capacity limits based on one or more overall performance metrics (e.g., average response time across all storage tiers for one or more storage groups) in order to select the promotion and demotion thresholds for the storage tiers.

Promotion may refer to movement of data from a first storage tier to a second storage tier where the second storage tier is characterized as having devices of higher performance than devices of the first storage tier. Demotion may refer generally to movement of data from a first storage tier to a second storage tier where the first storage tier is characterized as having devices of higher performance than devices of the second storage tier. As such, movement of data from a first tier of flash devices to a second tier of FC devices and/or SATA devices may be characterized as a demotion and movement of data from the foregoing second tier to the first tier a promotion. The promotion and demotion thresholds refer to thresholds used in connection with data movement.

As described in following paragraphs, one embodiment may use an allocation policy specifying an upper limit or maximum threshold of storage capacity for each of one or more tiers for use with an application. The partitioning of physical storage of the different storage tiers among the applications may be initially performed using techniques herein in accordance with the foregoing thresholds of the application's allocation policy and other criteria. In accordance with techniques herein, an embodiment may determine amounts of the different storage tiers used to store an application's data, and thus the application's storage group, subject to the allocation policy and other criteria. Such criteria may also include one or more performance metrics indicating a workload of the application. For example, an embodiment may determine one or more performance metrics using collected or observed performance data for a plurality of different logical devices, and/or portions thereof, used by the application. Thus, the partitioning of the different storage tiers among multiple applications may also take into account the workload or how "busy" an application is. Such criteria may also include capacity limits specifying how much of each particular storage tier may be used to store data for the application's logical devices. As described in various embodiments herein, the criteria may include one or more performance metrics in combination with capacity limits, performance metrics alone without capacity limits, or capacity limits alone without performance metrics. Of course, as will be appreciated by those of ordinary skill in the art, such criteria may include any of the foregoing in combination with other suitable criteria.

As an example, the techniques herein may be described with reference to a storage environment having three storage tiers—a first tier of only flash drives in the data storage system, a second tier of only FC disk drives, and a third tier of only SATA disk drives. In terms of performance, the foregoing three tiers may be ranked from highest to lowest as follows: first, second, and then third. The lower the tier ranking, the lower the tier's performance characteristics (e.g., longer latency times, capable of less I/O throughput/second/GB (or other storage unit), and the like). Generally, different types of physical devices or physical drives have different types of characteristics. There are different reasons why one may want to use one storage tier and type of drive over another depending on criteria, goals and the current performance characteristics exhibited in connection with performing I/O operations. For example, flash drives of the first tier may be a best choice or candidate for storing data which may be characterized as I/O intensive or "busy" thereby experiencing a high rate of I/Os to frequently access the physical storage device containing the LV's data. However, flash drives tend to be expensive in terms of storage capacity. SATA drives may be a best choice or candidate for storing data of devices requiring a large storage capacity and which are not I/O intensive with respect to access and retrieval from the physical storage device. The second tier of FC disk drives may be characterized as "in between" flash drives and SATA drives in terms of cost/GB and I/O performance. Thus, in terms of relative performance characteristics, flash drives may be characterized as having higher performance than both FC and SATA disks, and FC disks may be characterized as having a higher performance than SATA.

Since flash drives of the first tier are the best suited for high throughput/sec/GB, processing may be performed to determine which of the devices, and portions thereof, are characterized as most I/O intensive and therefore may be good candidates to have their data stored on flash drives. Similarly, the second most I/O intensive devices, and portions thereof, may be good candidates to store on FC disk drives of the second tier and the least I/O intensive devices may be good candidates to store on SATA drives of the third tier. As such, workload for an application may be determined using some measure of I/O intensity, performance or activity (e.g., I/O throughput/second, percentage of read operation, percentage of write operations, response time, etc.) of each device used for the application's data. Some measure of workload may be used as a factor or criterion in combination with others described herein for determining what data portions are located on the physical storage devices of each of the different storage tiers.

Figure 4:
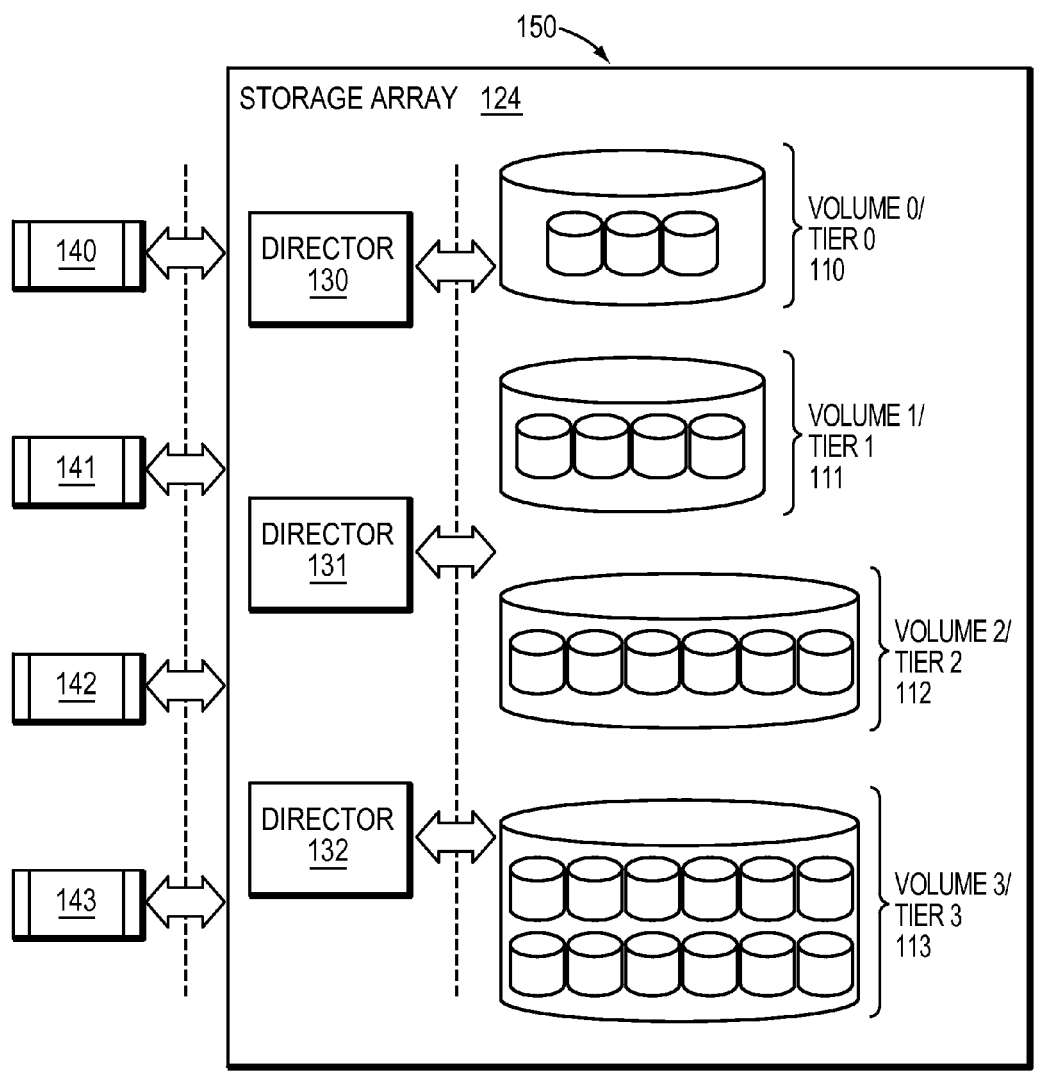
FIGS. 4, 5A and 5B are examples illustrating a data storage system, such as data storage array, including a plurality of storage tiers in an embodiment in accordance with techniques herein.

FIG. 4 is a schematic illustration showing a data storage system 150 that may be used in connection with an embodiment of the system described herein. The data storage system 150 may include a storage array 124 having multiple directors 130-132 and multiple storage volumes (LVs, logical devices or VOLUMES 0-3) 110-113. Host applications 140-144 and/or other entities (e.g., other storage devices, SAN switches, etc.) request data writes and data reads to and from the storage array 124 that are facilitated using one or more of the directors 130-132. The storage array 124 may include similar features as that discussed above.

The volumes 110-113 may be provided in multiple storage tiers (TIERS 0-3) that may have different storage characteristics, such as speed, cost, reliability, availability, security and/or other characteristics. As described above, a tier may represent a set of storage resources, such as physical storage devices, residing in a storage platform. Examples of storage disks that may be used as storage resources within a storage array of a tier may include sets SATA disks, FC disks and/or EFDs, among other known types of storage devices.

According to various embodiments, each of the volumes 110-113 may be located in different storage tiers. Tiered storage provides that data may be initially allocated to a particular fast volume/tier, but a portion of the data that has not been used over a period of time (for example, three weeks) may be automatically moved to a slower (and perhaps less expensive) tier. For example, data that is expected to be used frequently, for example database indices, may be initially written directly to fast storage whereas data that is not expected to be accessed frequently, for example backup or archived data, may be initially written to slower storage. In an embodiment, the system described herein may be used in connection with a Fully Automated Storage Tiering (FAST) product produced by EMC Corporation of Hopkinton, Mass., that provides for the optimization of the use of different storage tiers including the ability to easily create and apply tiering policies (e.g., allocation policies, data movement policies including promotion and demotion thresholds, and the like) to transparently automate the control, placement, and movement of data within a data storage system based on business needs. The techniques herein may be used to determine amounts or allocations of each storage tier used by each application based on capacity limits in combination with performance limits.

Figure 5A:
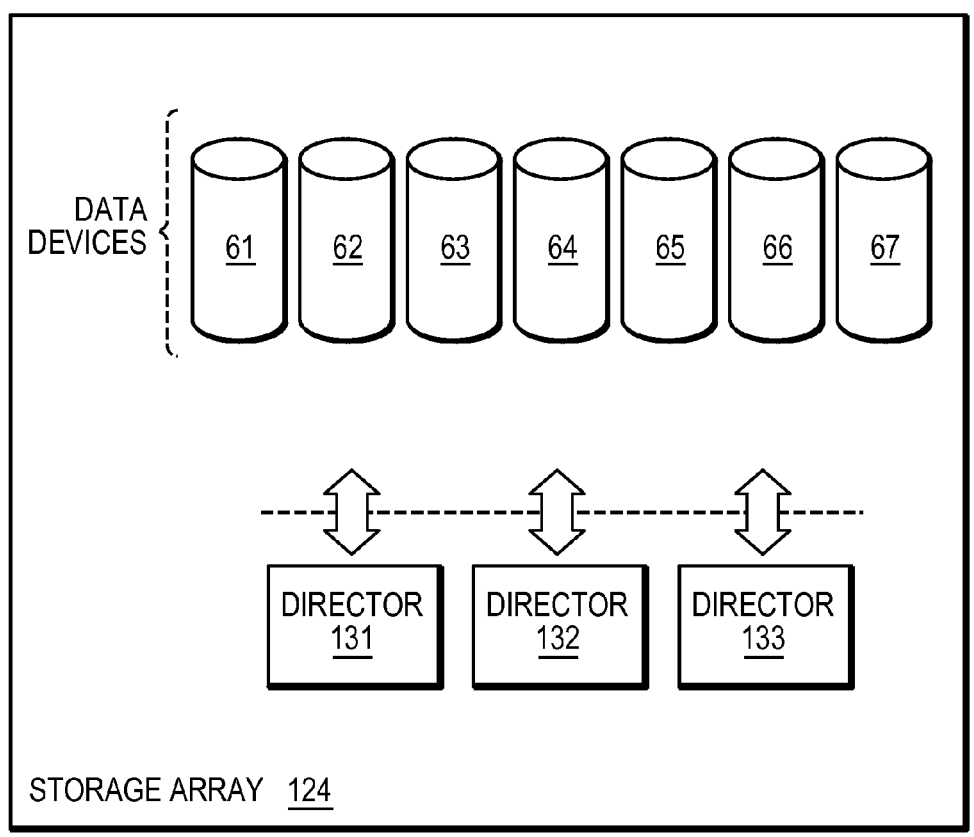

Referring to FIG. 5A, shown is a schematic diagram of the storage array 124 as including a plurality of data devices 61-67 communicating with directors 131-133. The data devices 61-67 may be implemented as logical devices like standard logical devices (also referred to as thick devices) provided in a Symmetrix® data storage device produced by EMC Corporation of Hopkinton, Mass., for example. In some embodiments, the data devices 61-67 may not be directly useable (visible) to hosts coupled to the storage array 124. Each of the data devices 61-67 may correspond to a portion (including a whole portion) of one or more of the disk drives 42-44 (or more generally physical devices). Thus, for example, the data device section 61 may correspond to the disk drive 42, may correspond to a portion of the disk drive 42, or may correspond to a portion of the disk drive 42 and a portion of the disk drive 43. The data devices 61-67 may be designated as corresponding to different classes, so that different ones of the data devices 61-67 correspond to different physical storage having different relative access speeds or RAID protection type (or some other relevant distinguishing characteristic or combination of characteristics), as further discussed elsewhere herein. Alternatively, in other embodiments that may be used in connection with the system described herein, instead of being separate devices, the data devices 61-67 may be sections of one data device.

Figure 5B:
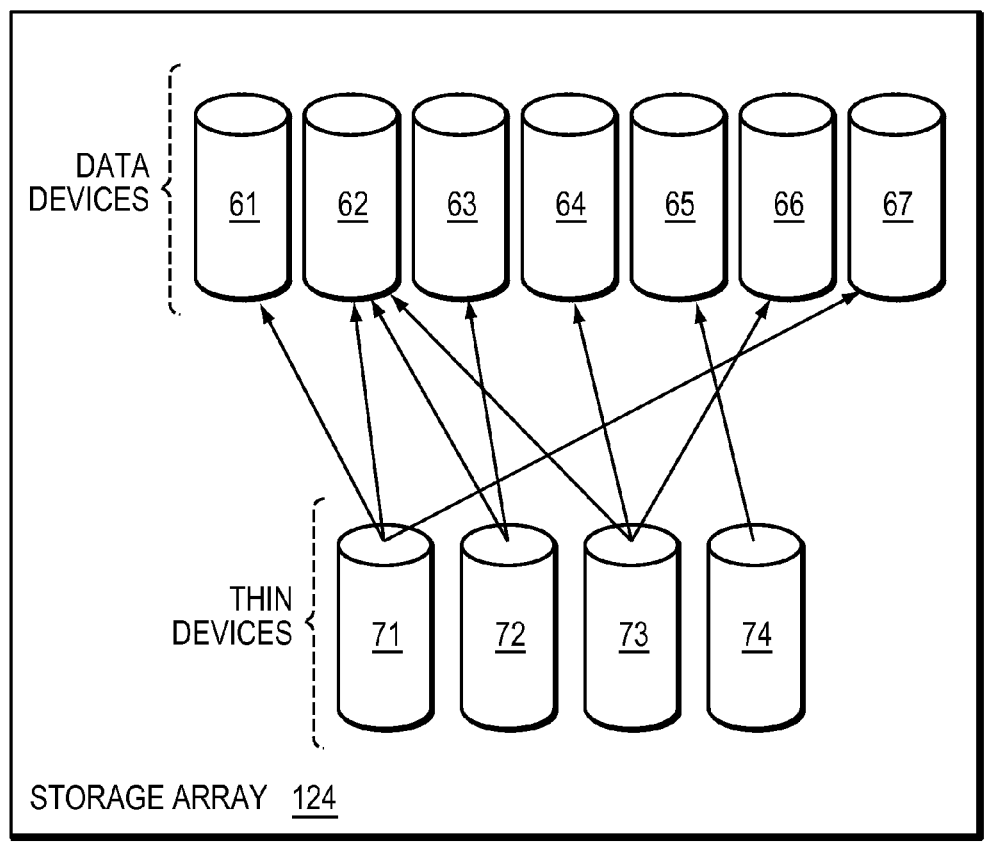

As shown in FIG. 5B, the storage array 124 may also include a plurality of thin devices 71-74 that may be adapted for use in connection with the system described herein when using thin provisioning. In a system using thin provisioning, the thin devices 71-74 may appear to a host coupled to the storage array 124 as one or more logical volumes (logical devices) containing contiguous blocks of data storage. Each of the thin devices 71-74 may contain pointers to some or all of the data devices 61-67 (or portions thereof). As described in more detail elsewhere herein, a thin device may be virtually provisioned in terms of its allocated physical storage in physical storage. That is, a thin device presented to a host as having a particular capacity may be allocated physical storage as needed, rather than allocated physical storage according to the entire thin device capacity defined upon creation of the thin device. As such, a thin device presented to the host as having a capacity with a corresponding LBA (logical block address) range may have portions of the LBA range for which storage is not allocated.

Figure 5C:
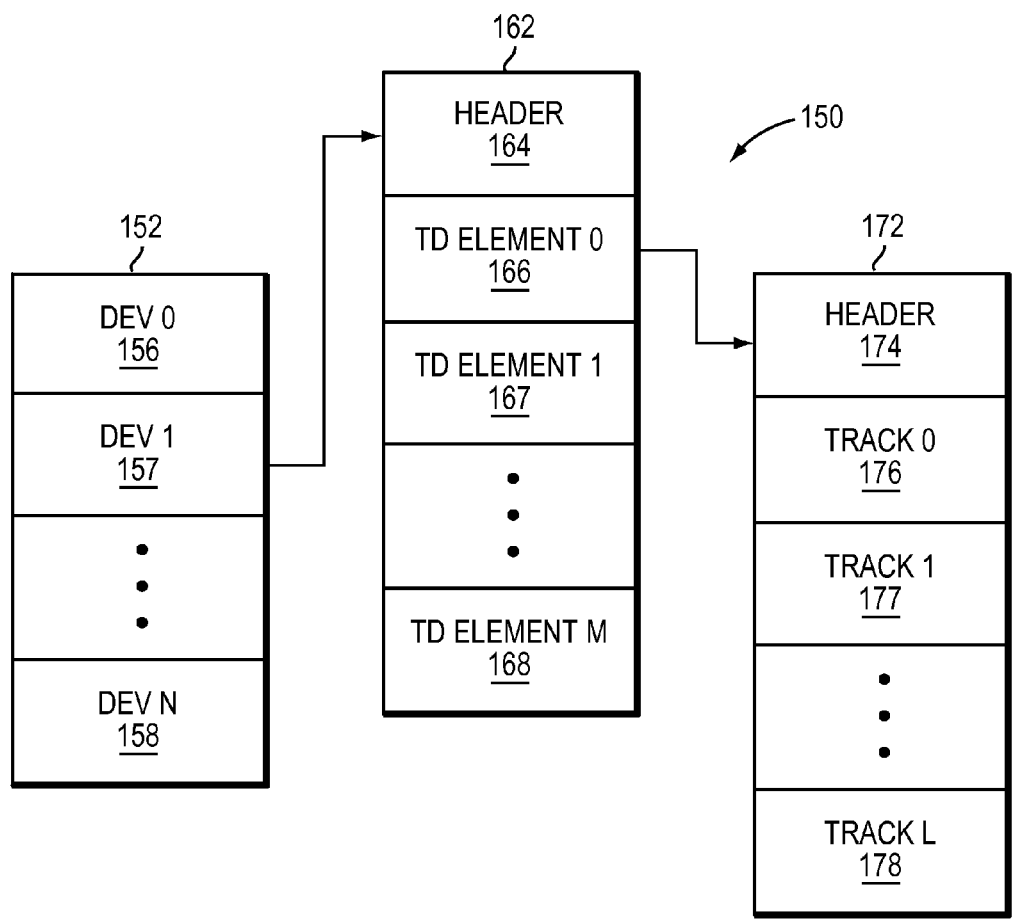
FIG. 5C is a schematic diagram illustrating tables that are used to keep track of device information in connection with an embodiment of the system described herein.

Referring to FIG. 5C, shown is a diagram 150 illustrating tables that are used to keep track of device information. A first table 152 corresponds to all of the devices used by a data storage system or by an element of a data storage system, such as an HA 21 and/or a DA 23. The table 152 includes a plurality of logical device (logical volume) entries 156-158 that correspond to all the logical devices used by the data storage system (or portion of the data storage system). The entries in the table 152 may include information for thin devices, for data devices (such as logical devices or volumes), for standard logical devices, for virtual devices, for BCV devices, and/or any or all other types of logical devices used in connection with the system described herein.

Each of the entries 156-158 of the table 152 correspond to another table that may contain information for one or more logical volumes, such as thin device logical volumes. For example, the entry 157 may correspond to a thin device table 162. The thin device table 162 may include a header 164 that contains overhead information, such as information identifying the corresponding thin device, information concerning the last used data device and/or other information including counter information, such as a counter that keeps track of used group entries (described below). The header information, or portions thereof, may be available globally to the data storage system.

The thin device table 162 may include one or more group elements 166-168, that contain information corresponding to a group of tracks on the data device. A group of tracks may include one or more tracks, the number of which may be configured as appropriate. In an embodiment herein, each group has sixteen tracks, although this number may be configurable.

One of the group elements 166-168 (for example, the group element 166) of the thin device table 162 may identify a particular one of the data devices 61-67 having a track table 172 that contains further information, such as a header 174 having overhead information and a plurality of entries 176-178 corresponding to each of the tracks of the particular one of the data devices 61-67. The information in each of the entries 176-178 may include a pointer (either direct or indirect) to the physical address on one of the physical disk drives of the data storage system that maps to the logical address(es) of the particular one of the data devices 61-67. Thus, the track table 162 may be used in connection with mapping logical addresses of the logical devices corresponding to the tables 152, 162, 172 to physical addresses on the disk drives or other physical devices of the data storage system.

The tables 152, 162, 172 may be stored in the global memory 25b of the data storage system. In addition, the tables corresponding to particular logical devices accessed by a particular host may be stored (cached) in local memory of the corresponding one of the HA's. In addition, an RA and/or the DA's may also use and locally store (cache) portions of the tables 152, 162, 172.

Figure 5D:
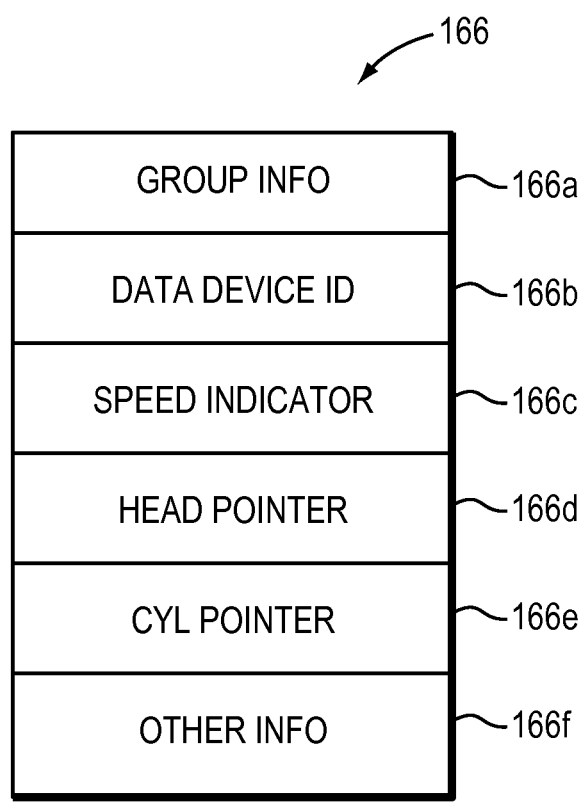
FIG. 5D is a schematic diagram showing a group element of a thin device table in connection with an embodiment of the system described herein.

Referring to FIG. 5D, shown is a schematic diagram illustrating a group element 166 of the thin device table 162 in connection with an embodiment of the system described herein. The group element 166 may includes a plurality of entries 166a-166f. The entry 166a may provide group information, such as a group type that indicates whether there has been physical address space allocated for the group. The entry 166b may include information identifying one (or more) of the data devices 61-67 that correspond to the group (i.e., the one of the data devices 61-67 that contains pointers for physical data for the group). The entry 166c may include other identifying information for the one of the data devices 61-67, including a speed indicator that identifies, for example, if the data device is associated with a relatively fast access physical storage (disk drive) or a relatively slow access physical storage (disk drive). Other types of designations of data devices are possible (e.g., relatively expensive or inexpensive). The entry 166d may be a pointer to a head of the first allocated track for the one of the data devices 61-67 indicated by the data device ID entry 166b. Alternatively, the entry 166d may point to header information of the data device track table 172 immediately prior to the first allocated track. The entry 166e may identify a cylinder of a first allocated track for the one the data devices 61-67 indicated by the data device ID entry 166b. The entry 166f may contain other information corresponding to the group element 166 and/or the corresponding thin device. In other embodiments, entries of the group table 166 may identify a range of cylinders of the thin device and a corresponding mapping to map cylinder/track identifiers for the thin device to tracks/cylinders of a corresponding data device. In an embodiment, the size of table element 166 may be eight bytes.

Accordingly, a thin device presents a logical storage space to one or more applications running on a host where different portions of the logical storage space may or may not have corresponding physical storage space associated therewith. However, the thin device is not mapped directly to physical storage space. Instead, portions of the thin storage device for which physical storage space exists are mapped to data devices, which are logical devices that map logical storage space of the data device to physical storage space on the disk drives or other physical storage devices. Thus, an access of the logical storage space of the thin device results in either a null pointer (or equivalent) indicating that no corresponding physical storage space has yet been allocated, or results in a reference to a data device which in turn references the underlying physical storage space.

Thin devices and thin provisioning are described in more detail in U.S. patent application Ser. No. 11/726,831, filed Mar. 23, 2007 (U.S. Patent App. Pub. No. 2009/0070541 A1), "Automated Information Life-Cycle Management With Thin Provisioning," Yochai, and U.S. Pat. No. 7,949,637, Issued May 24, 2011, "Storage Management for Fine Grained Tiered Storage with Thin Provisioning", to Burke, both of which are incorporated by reference herein.

As discussed elsewhere herein, the data devices 61-67 (and other logical devices) may be associated with physical storage areas (e.g., disk drives, tapes, solid state storage, etc.) having different characteristics. In various embodiments, the physical storage areas may include multiple tiers of storage in which each sub-tier of physical storage areas and/or disk drives may be ordered according to different characteristics and/or classes, such as speed, technology and/or cost. The devices 61-67 may appear to a host coupled to the storage array 124 as a logical volume (logical device) containing a contiguous block of data storage, as discussed herein. Accordingly, each of the devices 61-67 may map to storage areas across multiple physical storage drives. The granularity at which a data storage system described herein operates may be smaller than at the file level, for example potentially as small as a single byte, but more practically at the granularity of a single logical block or collection of sequential data blocks. A data block may be of any size including file system or database logical block size, physical block, track or cylinder and/or other size. Multiple data blocks may be substantially the same size or different sizes, such as different size data blocks for different storage volumes or different sized data blocks within a single storage volume.

In accordance with techniques herein, an embodiment may allow for locating all of the data of a single logical portion or entity in a same tier or in multiple different tiers depending on the logical data portion or entity. In an embodiment including thin devices, the techniques herein may be used where different portions of data of a single thin device may be located in different storage tiers. For example, a thin device may include two data portions and a first of these two data portions may be identified as a "hot spot" of high I/O activity (e.g., having a large number of I/O accesses such as reads and/or writes per unit of time) relative to the second of these two portions. As such, an embodiment in accordance with techniques herein may have added flexibility in that the first portion of data of the thin device may be located in a different higher performance storage tier than the second portion. For example, the first portion may be located in a tier comprising flash devices and the second portion may be located in a different tier of FC or SATA drives.

Figure 6:
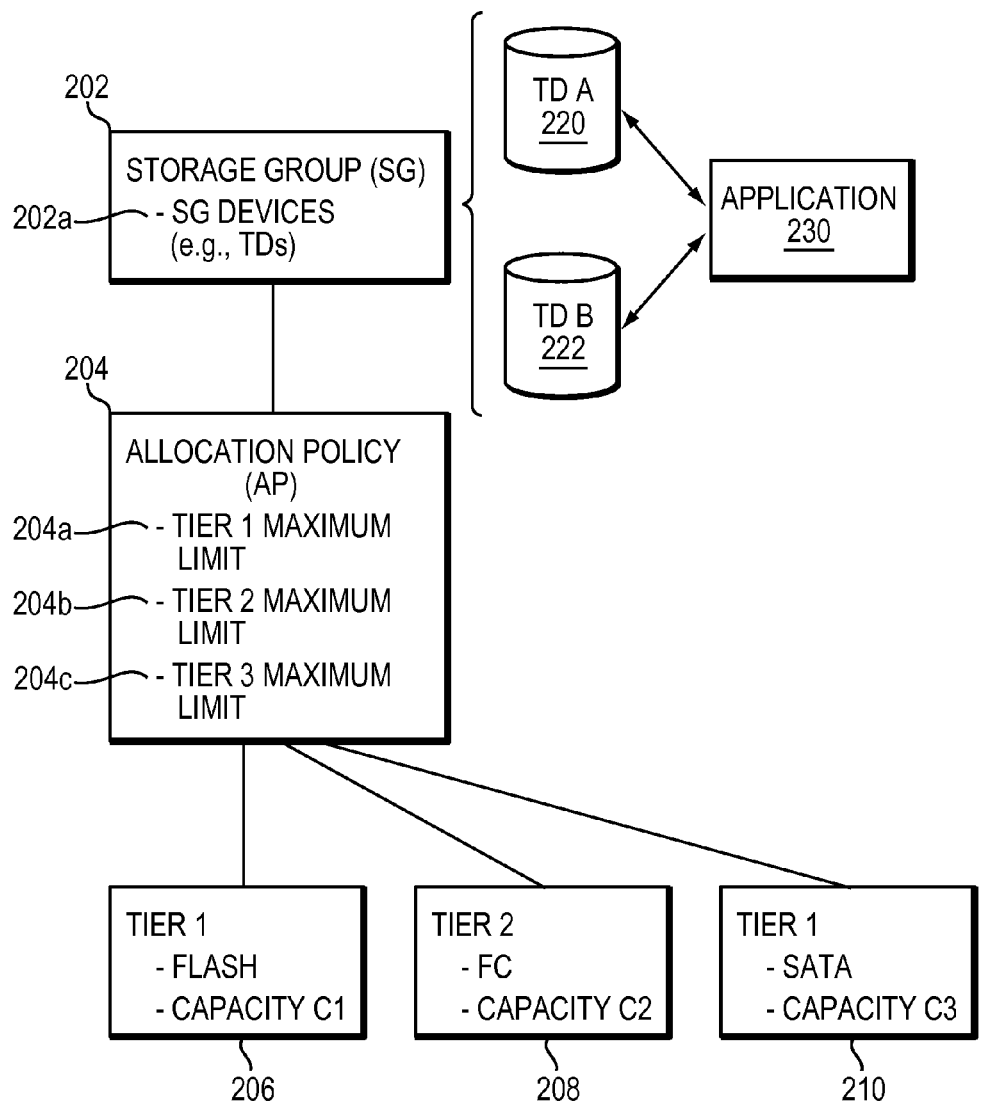
FIGS. 6 and 7 are examples illustrating a storage group, allocation policy and associated storage tiers in an embodiment in accordance with techniques herein.

Referring to FIG. 6, shown is an example illustrating information that may be defined and used in connection with techniques herein. The example 200 includes multiple storage tiers 206, 208, and 210, an allocation policy (AP) 204, and storage group (SG) 202. The SG 202 may include one or more thin devices (TDs), such as TD A 220 and TD B 222, used by an application 230. The application 230 may execute, for example, on one of the hosts of FIG. 1. The techniques herein may be used to determine how to partition physical storage of the multiple storage tiers 206, 208 and 210 for use in storing or locating the application's data, such as data of the TDs 220 and 222. It should be noted that the particular number of tiers, TDs, and the like, should not be construed as a limitation. An SG may represent a logical grouping of TDs used by a single application although an SG may correspond to other logical groupings for different purposes. An SG may, for example, correspond to TDs used by multiple applications.

Each of 206, 208 and 210 may correspond to a tier definition as described elsewhere herein. Element 206 represents a first storage tier of flash drives having a tier capacity limit C1. Element 208 represents a first storage tier of FC drives having a tier capacity limit C2. Element 210 represents a first storage tier of SATA drives having a tier capacity limit C3. Each of C1, C2 and C3 may represent an available or maximum amount of storage capacity in the storage tier that may be physical available in the system. The AP 204 may be associated with one of more SGs such as SG 202. The AP 204 specifies, for an associated SG 202, a capacity upper limit or maximum threshold for one or more storage tiers. Each such limit may identify an upper bound regarding an amount of storage that may be allocated for use by the associated SG. The AP 204 may be associated with one or more of the storage tiers 206, 208 and 210 that may be defined in a multi-tier storage environment. The AP 204 in this example 200 includes limit 204a identifying a maximum or upper limit of storage for tier1, limit 204b identifying a maximum or upper limit of storage for tier2, and limit 204c identifying a maximum or upper limit of storage for tier3. The SG 202 may be based on an SG definition identifying 202a the logical devices, such as TDs included in the SG.

In connection with techniques herein, the maximum limits 204a, 204b and 204c each represent an upper bound of a storage capacity to which an associated SG is subjected to. The techniques herein may be used to partition less than the amount or capacity represented by such limits. An amount of physical storage of a tier allocated for use by an application is allowed to vary up to the tier limit as defined in the AP 204 in accordance with other criteria associated with the application such as, for example, varying application workload. The optimizer may vary the amount of storage in each tier used by an SG202, and thus an application, based on workload and possibly other criteria when performing a cost benefit analysis, where such amounts are subject to the limits of the SG's AP and also performance limits described in more detail elsewhere herein. At a second point in time, the workloads and possibly other criteria for the applications may change and the optimizer may reparation the storage capacity used by each application subject to the capacity limits of APs and performance limits.

Figure 7:
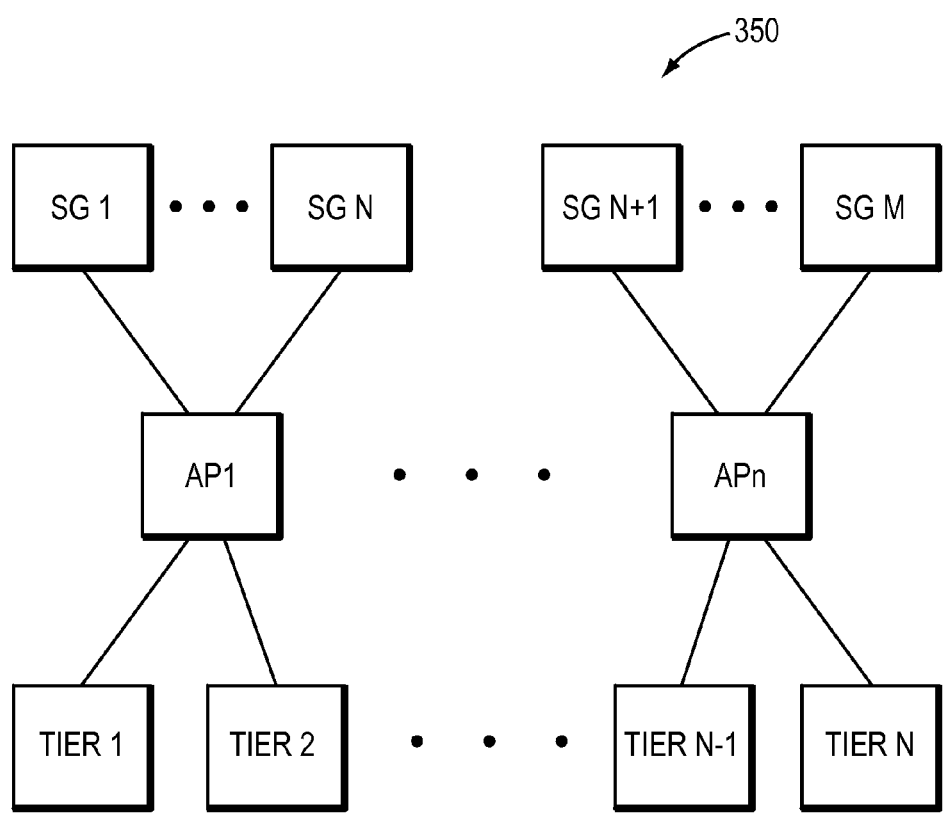

Referring to FIG. 7, shown is an example which more generally illustrates different associations between SGs, APs and tiers in an embodiment in accordance with techniques herein. The example 350 illustrates that an embodiment may have multiple storage tiers (e.g., tiers 1-N), multiple APs (e.g., AP1-N), and multiple SGs (e.g., SG 1-M). Each AP may be associated with one or more of the storage tiers. Each AP may also be associated with different tiers than other APs. For example, APn is associated with Tier N but AP1 is not. For each tier associated with an AP, the AP may define a maximum capacity limit as described in connection with FIG. 6. Each AP may be associated with one or more SGs. For example SGs1-N may be associated with a same AP1, and SGs N+1 through M may be associated with a same APn.

With reference back to FIG. 6, each of the maximum capacity limits may have any one of a variety of different forms. For example, such limits may be expressed as a percentage or portion of tier total storage capacity (e.g., such as a percentage of C1, C2, or C3), as an integer indicating an amount or quantity of storage 410c (e.g., indicating a number of bytes or other number of storage units), and the like.

Data used in connection with techniques herein, such as the performance data of FIG. 3 used in determining device and SG workloads, may be obtained through observation and monitoring actual performance. Data may also be determined in other suitable ways such as, for example, through simulation, estimation, and the like. Observed or collected data may be obtained as described in connection with FIG. 3 by monitoring and recording one or more aspects of I/O activity for each TD, and portions thereof. For example, for each TD, and/or portions thereof, an average number of reads occurring within a given time period may be determined, an average number of writes occurring within a given time period may be determined, an average number of read misses occurring within a given time period may be determined, and the like. It should be noted that the operations of read and write with respect to a TD may be viewed as read and write requests or commands from the DA, controller or other backend physical device interface. Thus, these operations may also be characterized as an average number of operations with respect to the physical storage device (e.g., average number of physical device reads, writes, and the like, based on physical device accesses). This is in contrast to observing or counting a number of particular types of I/O requests (e.g., reads or writes) as issued from the host and received by a front-end component. To illustrate, a host read request may not result in a read request or command issued to the DA if there is a cache hit and the requested data is in cache. The host read request results in a read request or command issued to the DA to retrieve data from the physical drive only if there is a read miss. Furthermore, when writing data of a received host I/O request to the physical device, the host write request may result in multiple reads and/or writes by the DA in addition to writing out the host or user data of the request. For example, if the data storage system implements a RAID data protection technique, such as RAID-5, additional reads and writes may be performed such as in connection with writing out additional parity information for the user data. Thus, observed data gathered to determine workload, such as observed numbers of reads and writes, may refer to the read and write requests or commands performed by the DA. Such read and write commands may correspond, respectively, to physical device accesses such as disk reads and writes that may result from a host I/O request received by an FA.

It should be noted that movement of data between tiers from a source tier to a target tier may include determining free or unused storage device locations within the target tier. In the event there is an insufficient amount of free of unused storage in the target tier, processing may also include displacing or relocating other data currently stored on a physical device of the target tier. An embodiment may perform movement of data to and/or from physical storage devices using any suitable technique. Also, any suitable technique may be used to determine a target storage device in the target tier where the data currently stored on the target is relocated or migrated to another physical device in the same or a different tier.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

As described above, a thin device (also referred to as a virtual provision device) is a device that represents a certain capacity having an associated address range. Storage may be allocated for thin devices in chunks or data portions of a particular size as needed rather than allocate all storage necessary for the thin device's entire capacity. Therefore, it may be the case that at any point in time, only a small number of portions or chunks of the thin device actually are allocated and consume physical storage on the back-end (on physical disks, flash or other physical storage devices). A thin device may be constructed of chunks having a size that may vary with embodiment. For example, in one embodiment, a chunk may correspond to a group of 12 tracks (e.g., 12 tracks*64 Kbytes/track=768 Kbytes/chunk). As also noted with a thin device, the different chunks may reside on different data devices in one or more storage tiers. In one embodiment, as will be described below, a storage tier may consist of one or more storage pools. Each storage pool may include multiple LVs and their associated physical devices. With thin devices, a system in accordance with techniques herein has flexibility to relocate individual chunks as desired to different devices in the same as well as different pools or storage tiers. For example, a system may relocate a chunk from a flash storage pool to a SATA storage pool. In one embodiment using techniques herein, a thin device can be bound to a particular storage pool of a storage tier at a point in time so that any chunks requiring allocation of additional storage, such as may occur when writing data to the thin device, result in allocating storage from this storage pool. Such binding may change over time for a thin device.

A thin device may contain thousands and even hundreds of thousands of such chunks. As such, tracking and managing performance data such as one or more performance statistics for each chunk, across all such chunks, for a storage group of thin devices can be cumbersome and consume an excessive amount of resources. Described in following paragraphs are techniques that may be used in connection with collecting performance data about thin devices where such information may be used to determine which chunks of thin devices are most active relative to others. Such evaluation may be performed in connection with determining promotion/demotion thresholds use in evaluating where to locate and/or move data of the different chunks with respect to the different storage tiers in a multi-storage tier environment. In connection with examples in following paragraphs, details such as having a single storage pool in each storage tier, a single storage group, and the like, are provided for purposes of illustration. Those of ordinary skill in the art will readily appreciate the more general applicability of techniques herein in other embodiments such as, for example, having a storage group including a plurality of storage pools, and the like.

Figure 8A:
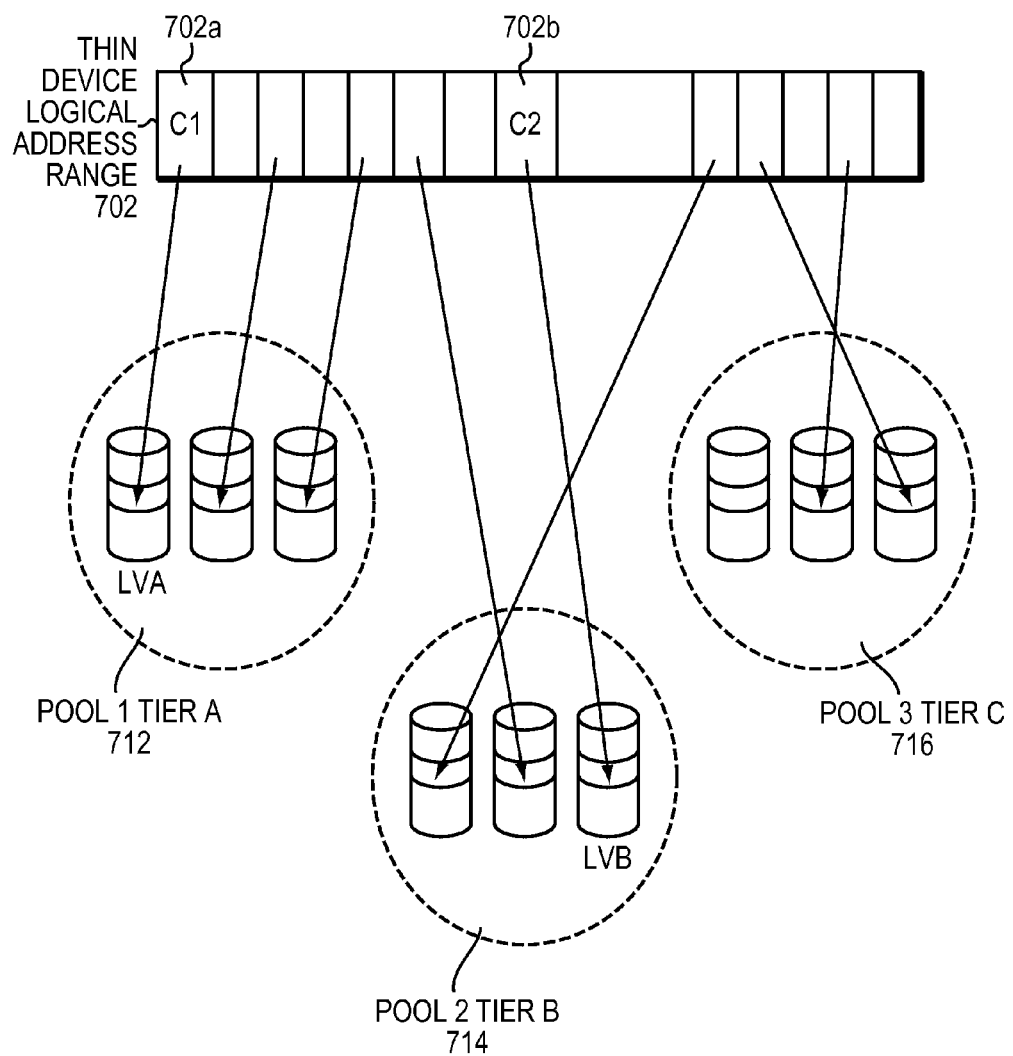

Referring to FIG. 8A, shown is an example 700 illustrating use of a thin device in an embodiment in accordance with techniques herein. The example 700 includes three storage pools 712, 714 and 716 with each such pool representing a storage pool of a different storage tier. For example, pool 712 may represent a storage pool of tier A of flash storage devices, pool 714 may represent a storage pool of tier B of FC storage devices, and pool 716 may represent a storage pool of tier C of SATA storage devices. Each storage pool may include a plurality of logical devices and associated physical devices (or portions thereof) to which the logical devices are mapped. Element 702 represents the thin device address space or range including chunks which are mapped to different storage pools. For example, element 702a denotes a chunk C1 which is mapped to storage pool 712 and element 702b denotes a chunk C2 which is mapped to storage pool 714. Element 702 may be a representation for a first thin device which is included in a storage group of one or more thin devices.

It should be noted that although the example 700 illustrates only a single storage pool per storage tier, an embodiment may also have multiple storage pools per tier.

Referring to FIG. 8B, shown is an example representation of information that may be included in an allocation map in an embodiment in accordance with techniques herein. An allocation map may be used to identify the mapping for each thin device (TD) chunk (e.g. where each chunk is physically located). Element 760 represents an allocation map that may be maintained for each TD. In this example, element 760 represents information as may be maintained for a single TD although another allocation map may be similarly used and maintained for each other TD in a storage group. Element 760 may represent mapping information as illustrated in FIG. 8A such as in connection the mapping of 702 to different storage pool devices. The allocation map 760 may contain an entry for each chunk and identify which LV and associated physical storage is mapped to the chunk. For each entry or row of the map 760 corresponding to a chunk, a first column 760a, Chunk ID, denotes an identifier to uniquely identify the chunk of the TD, a second column 760b, indicates information about the LV and offset to which the chunk is mapped, and a third column storage pool 760c denotes the storage pool and tier including the LV of 760b. For example, entry 762 represents chunk C1 illustrated in FIG. 8A as 702a and entry 764 represents chunk C2 illustrated in FIG. 8A as 702b. It should be noted that although not illustrated, the allocation map may include or otherwise use other tables and structures which identify a further mapping for each LV such as which physical device locations map to which LVs. This further mapping for each LV is described and illustrated elsewhere herein such as, for example, with reference back to FIG. 5B. Such information as illustrated and described in connection with FIG. 8B may be maintained for each thin device in an embodiment in accordance with techniques herein.

In connection with collecting statistics characterizing performance, workload and/or activity for a thin device, one approach may be to collect the information per chunk or, more generally, for the smallest level of granularity associated with allocation and de-allocation of storage for a thin device. Such statistics may include, for example, a number of reads/unit of time, #writes/unit of time, a number of pre-fetches/unit of time, and the like. However, collecting such information at the smallest granularity level does not scale upward as number of chunks grows large such as for a single thin device which can have up to, for example 300,000 chunks.

Therefore, an embodiment in accordance with techniques herein may collect statistics on a grouping of "N" chunks also referred to as an extent, where N represents an integer number of chunks, N>0. N may be, for example, 480 in one embodiment. Each extent may represent a consecutive range or portion of the thin device in terms of thin device locations (e.g., portion of the address space or range of the thin device). Note that the foregoing use of consecutive does not refer to physical storage locations on physical drives but rather refers to consecutive addresses with respect to a range of addresses of the thin device which are then mapped to physical device locations which may or may not be consecutive, may be on the same or different physical drives, and the like. For example, in one embodiment, an extent may be 480 chunks (N=480) having a size of 360 MBs (megabytes).

An extent may be further divided into sub extents, where each sub extent is a collection of M chunks. M may be, for example 10 in one embodiment. In one embodiment, the sub-extent size may correspond to the smallest granularity of data movement. In other words, the sub extent size represents the atomic unit or minimum amount of data that can be operated upon when performing a data movement such as between storage tiers.

Figure 9:
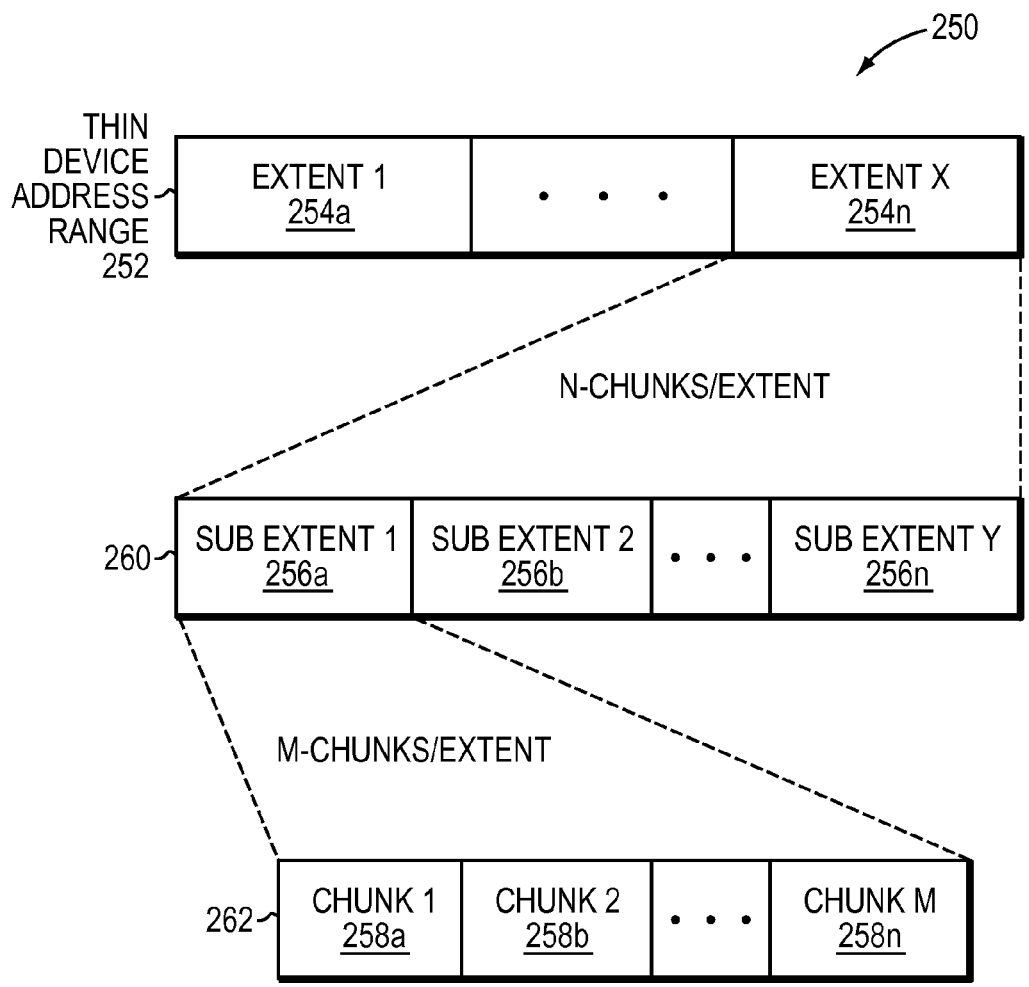
FIG. 9 is an example illustrating data portions comprising a thin device's logical address range.

Referring to FIG. 9, shown is an example illustrating partitioning of a thin device's address space or range in an embodiment in accordance with techniques herein. The example 250 includes a thin device address space or range 252 which, as described elsewhere herein, includes chunks mapped to physical storage locations. The thin device address space or range 252 may be partitioned into one or more extents 254a-254n. Each of the extents 254a-254n may be further partitioned into sub-extents. Element 260 illustrates that extent X 254n may include sub extents 256a-256n. Although only detail is illustrated for extent 254n, each of the other extents of the thin device also includes a same number of sub extents as illustrated for 254n. Each of the sub extents 256a-256n may represent a grouping of "M" chunks. Element 262 illustrates that sub extent 1 256a may include chunks 258a-258n. Although only detail is illustrated for sub extent 256a, each of the other sub extents 256b-256n also includes a same number of "M" chunks as illustrated for 256a. Thus, each of the extents 254a-254n may represent an grouping of "N" chunks, where N=#sub extents/extent*M chunks/sub extent        EQUATION 1

An embodiment in accordance with techniques herein may collect statistics for each extent and also other information characterizing activity of each sub extent of a thin device. Statistics for each extent may be characterized as either long term or short term. Short term refers to statistics which may reflect performance, workload, and/or I/O activity of an extent with respect to a relatively short window of time. Thus, short term statistics may reflect recent extent activity for such a short time period. In contrast and relative to short term, long term refers to statistics reflecting performance, workload and/or I/O activity of an extent with respect to a longer period of time. Depending on the evaluation being performed, such as by the optimizer, it may be desirable to place greater weight on short term information than long term, or vice versa. Furthermore, the information maintained per sub extent may be used as needed once particular extents of interest have been identified.

Figure 10:
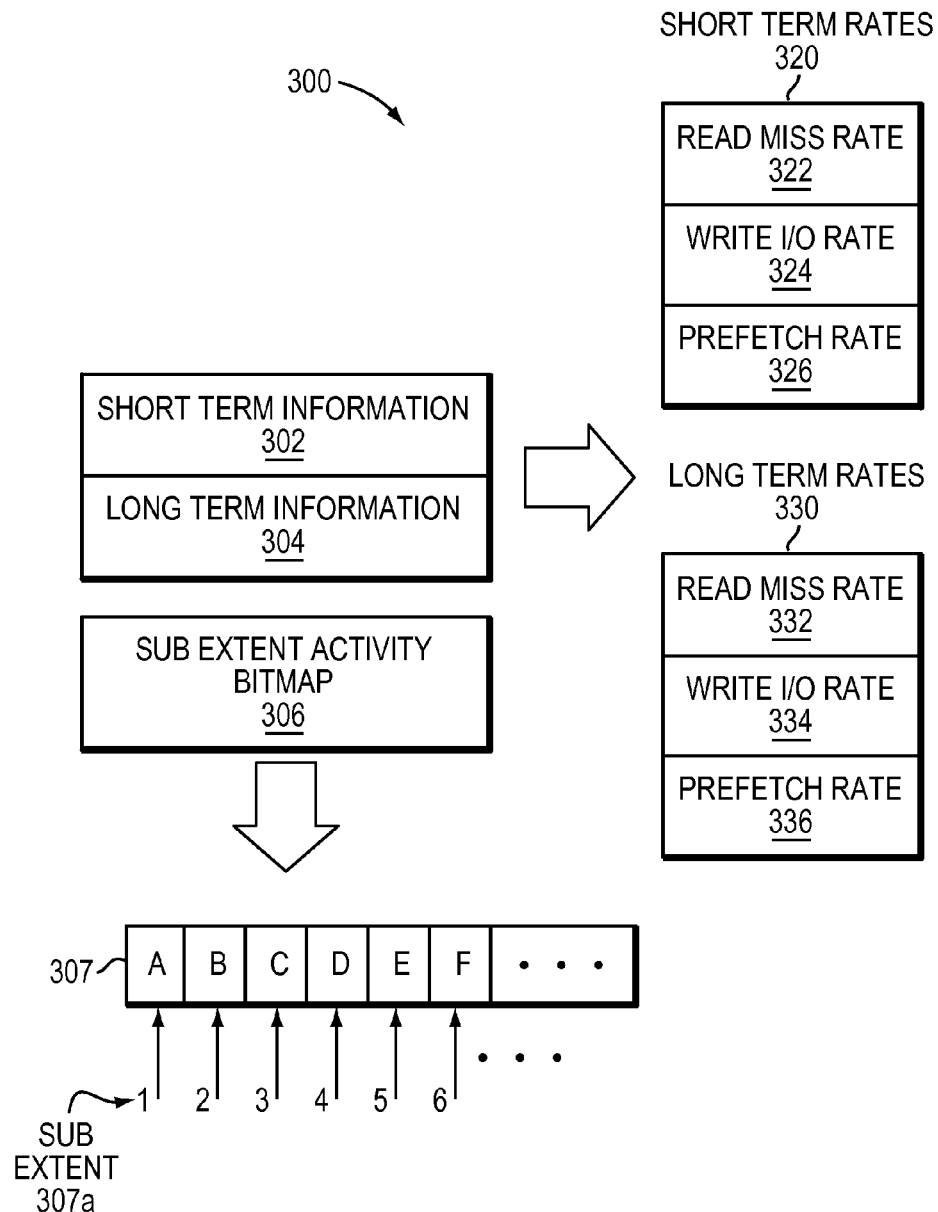
FIG. 10 is an example of performance information that may be determined in connection with thin devices in an embodiment in accordance with techniques herein.

Referring to FIG. 10, shown is an example of information that may be collected and used in connection each extent in an embodiment in accordance with techniques herein. The example 300 illustrates that short term information 302, long term information 304 and a sub extent activity bitmap 306 may be collected for each extent. The short term information 302 and long term information 304 may be used in connection with determining short term rates 320 and long term rates 330 for each extent. The statistics included in 302, 304, 320 and 330 may reflect activity with respect to the entire extent. The activity bitmap 306 is illustrated in further detail by element 307 as including an entry for each sub extent in the associated extent. Entries of 307 are denoted by A, B, C, and the like. Each of the entries of 307 represents aggregated or collective activity information for a corresponding sub extent denoted by the numeric identifiers 307a of 1, 2, 3, etc. Each entry of 307 may include one or more bits used to encode an activity level with respect to all chunks of a corresponding sub-extent. For example, the entry of 307 denoted as A represents an activity level for all chunks in sub extent 1. An embodiment may use any number of bits for each entry of the activity bitmap 306, 307. For example, in one embodiment, each entry of the activity bitmap may be 2 bits capable of representing any of 4 integer values—0, 1, 2, and 3.

As will be described in following paragraphs, the short term rates 320, long term rates 330 and sub extent activity bitmap 306 may be used in connection with a variety of different evaluations such as by the optimizer 138. Generally, the activity level information or data for an extent such as illustrated in FIG. 10 may be referred to as extent activity level information including one or more metrics indicating an activity level for the extent. The extent activity level information may comprise short term activity information (e.g., such as 302 and/or 320) and long term activity information (e.g., such as 304 and 330).

In one embodiment, the short term rates 320 for an extent may include a read miss rate (e.g., random read miss (RRM) rate) 322, a write I/O rate 324 and a pre-fetch rate 326 for the extent. The long term rates 330 for an extent may include a read miss rate 332 (e.g., number of read misses/unit of time, where a read miss refers to a cache miss for a read), a write I/O rate 334 (e.g., number of writes/unit of time) and a pre-fetch rate 336 (e.g., number of pre-fetches/unit of time) for the extent. As known in the art, data may be pre-fetched from a physical device and placed in cache prior to reference or use with an I/O operation. For example, an embodiment may perform sequential stream I/O recognition processing to determine when consecutive portions of a thin device are being referenced. In this case, data of the sequential stream may be pre-fetched from the physical device and placed in cache prior to usage in connection with a subsequent I/O operation. In connection with a portion of data at a first point in a sequential stream associated with a current I/O operation, data subsequent to the first point may be pre-fetched such as when obtaining the portion from a physical device in anticipation of future usage with subsequent I/Os. The short term pre-fetch rate 326, as well as the long term pre-fetch rate 336, may also be referred to as denoting a number of sequential reads or sequential read miss operations performed since such pre-fetching may occur in response to determination that a read operation is performed for data which is not in cache (read miss) and the read operation is for data included in a series of sequentially read data portions as described above. The read miss rates 322 and 332 may represent random read miss (RRM) rates where such read misses (e.g., data requested not currently in cache) are associate with read operations not included in connection with reading data of a sequential stream (e.g., all read misses not used in connection with computing 326 and 336).

Each of the foregoing rates of 320 and 330 may be with respect to any unit of time, such as per second, per hour, and the like. In connection with describing elements 302 and 304 in more detail, what will be described is how an embodiment in accordance with techniques herein may determine the short term rates 320 and long term rates 330 using a decay function and decay coefficients.

In an embodiment in accordance with techniques herein, a decay coefficient may be characterized as a weighting factor given to previous activity information. The higher the coefficient, the greater the weight given to previous activity information for the extent. Thus, the adjusted activity level of an extent at a current time, "An", may be generally represented as a function of a current observed or actual activity level for the current time, "$a_n$", a decay coefficient, "r", and previous adjusted activity level for the previous time period or sampling period, "$A_{n-1}$". In connection with the foregoing, "A" may represent an adjusted activity level, "n" may denote the current time period or sampling period and "n−1" may denote the immediately prior or previous time period or sampling period at which the activity for the extent was determined. In other words, "$a_n$" is adjusted to take into account previous activity as represented by "$A_{n-1}$" and "An" represents the resulting adjusted value of "$a_n$". With respect to a statistic or metric such as a number or read misses, "$a_n$" and "An" may each represent an integer quantity or number of read misses within a current sampling period, "n". The foregoing may generally be represented as:

$$An = a_n + (r * A_{n-1}) \quad \quad \text{EQUATION 2}$$

wherein $a_n$ is the actual observed activity metric for the current or "nth" sampling period, "r" is a decay coefficient, "$A_n$" is the adjusted activity metric for the current or "nth" sampling period, and "$A_{n-1}$" is the adjusted activity metric from the previous or "n−1" sampling period.

Beginning with an initial time period or sampling period, denoted by i="0" (zero), the adjusted activity A0 may be initially that which is observed, a0. Subsequent observed or actual activity levels may be adjusted as described above. Generally, "$a_i$" may denote an actual or observed value obtained for an activity metric for a sampling period "i", where "i" is an integer greater than or equal to 0. "Ai" may similarly denote an adjusted activity metric (or adjusted value for "$a_i$") for a sampling period "i", where "i" is an integer greater than or equal to 0. Thus, for consecutive sample periods at which actual or observed activity metrics are obtained (as denoted by lower case "$a_i$"s), corresponding adjusted activity levels (e.g., "A" values) may be determined as follows:

A0=a0 /* Adjusted activity level A0, at time=0 or initially */

A1=a1+(r*A0) /* Adjusted activity level A1, at first sampling period, i=1

A2=a2+(r*A1) /* Adjusted activity level A2, at second sampling period, i=2*/

:

and so on for subsequent sampling periods 3, 4, and the like, based on EQUATION 2.

In connection with EQUATION 2, 0<=r<1, where "r" is a decay coefficient or weight given to previous activity. Varying "r" in EQUATION 2 results in accordingly varying the weight given to past or previous activity. If r=0, then no weight is given to previous or historic values. Thus, the closer "r" is to 0, the lesser weight given to previous activity. Similarly, the closer "r" is to 1, the greater the weight given to previous activity. In connection with determining an adjusted activity level, An, using EQUATION 2 for short term and long term, different decay coefficients may be selected. Generally "r" for short term is less than "r" used in connection with long term activity. For example, in one embodiment, "r" used in connection short term activity levels may be 50% or 0.50 or smaller. "r" used in connection with long term activity levels may be 80% or 0.80 or larger. The foregoing are exemplary values that may be selected for "r" in connection with short term and long term activity levels depending on the weight to be given to previous activity. In connection with short term activity, a decay coefficient may be selected in accordance with providing a relatively short term rate of decay for an activity level metric determined at a point in time. For example, a short term rate of decay may provide for a rate of decay for an activity level metric on the order of one or more hours (e.g., less than a day). In connection with long term activity, a decay coefficient may be selected in accordance with providing a relatively long term rate of decay for an activity level metric determined at a point in time. For example, a long term rate of decay may provide for a rate of decay for an activity level metric on the order of one or more days, a week, and the like. Thus, an activity metric at a first point in time may have a weighted or residual effect on an adjusted activity level determined at a later point in time in accordance with the selected decay coefficient indicating the rate of decay of the activity metric.

As mentioned above, EQUATION 2 results in a metric or count, such as a number of read misses, number of writes, or number or pre-fetches during a sample period. It may be desirable to also determine a rate with respect to a unit of time, such as per second, per hour, and the like, for each of the foregoing adjusted activity metrics An. A rate with respect to a unit of time for the adjusted activity level An may be represented as:

$$Ar = An * (1-r)/(1-r^{n-1}) \quad \quad \text{EQUATION 3}$$

where Ar=the adjusted activity rate per unit of time, r=decay coefficient or weight as described above, n=denotes an "nth" sampling period as described above, An=adjusted activity level determined for a given sampling period "n" (e.g. using EQUATION 2 as described above).

Generally, the higher the decay coefficient, r, the slower the change in Ar as may be the desired case with long term Ar values. Thus an embodiment may select decay coefficients for use with long term and short term Ar values so that, when plotted with respect to time, long term Ar values generally have a smaller slope than that associated with short term Ar values.

Figure 11:
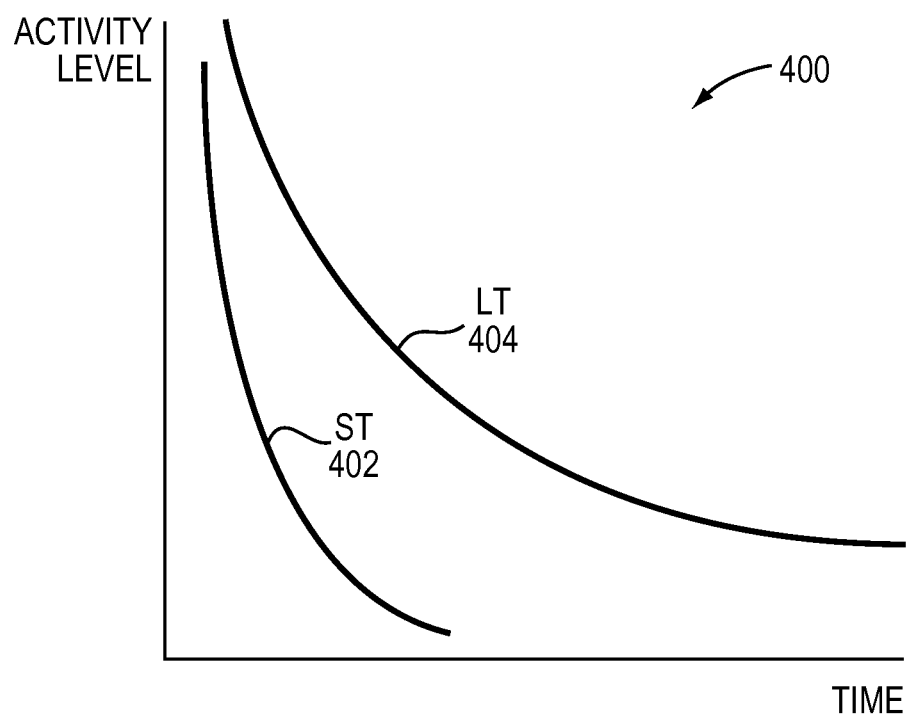
FIG. 11 is a graphical illustration of long term and short term statistics described herein.

Referring to FIG. 11, shown is an example graphically illustrating the general shape of curves for long term (LT) and short term (ST) values in an embodiment in accordance with techniques herein. The activity level values (Y-axis values) are plotted with respect to time (X-axis). The activity level values may be determined using EQUATIONS 2 and/or 3. Curve 402 may be produced using one of EQUA- TIONS 2 and 3 where a first value for the decay coefficient "r" is selected for ST usage. Curve 404 may be produced using one of EQUATIONS 2 and 3 where a second value for the decay coefficient "r" is selected for LT usage. The values selected for "r" in connection with 402 and 404 may be relative so that the first value for "r" used with 402 is less than the second value for "r" used with 404.

In one embodiment, each of the different An values determined using EQUATION 2 may be converted to a corresponding Ar value using EQUATION 3 when desired.

In connection with the foregoing, for example, with respect to a number of read misses, "$a_n$" represents the number of such operations that have occurred in a current sample period, n. For example, if a sample period=10 minutes so that statistics for an extent are collected and/or computed every 10 minutes, "$a_n$" represents the number of read misses that occurred in the last 10 minute sample period or time interval. $A_{n-1}$ represents the previous or last A calculation (e.g., as determined using EQUATION 2) from the previous sample period, denoted "n−1".

With reference back to FIG. 10, an embodiment may collect short term information 302 as counter values indicating a count or number of each type of operation for a current time period or sampling period "n". The following may represent different "$a_n$" values as included in the short term information 302 for an extent: read miss count (number of read misses for the extent during the sampling period), pre-fetch count (number of pre-fetches for the extent during the sampling period) and write count (number of writes for the extent during the sampling period).

The short term information 302 may also include storing previous A values as determined for the sampling period "n−1" using EQUATION 2 above. For example, short term information 302 may also include storing three (3) previous adjusted activity level values or A values for sampling period "n−1" using EQUATION 2 above for the read miss count, pre-fetch count and write count.

The short term information 302 may also include a timestamp value indicating the timestamp associated with the previous sampling period "n−1".

Using the above-mentioned short term information 302, an embodiment may calculate updated short term rates 320 using EQUATION 3 for a sampling period "n" for a selected "r" as a short term decay coefficient. With each new sampling period, the short term information may be accordingly updated so that which is associated with sampling period "n" subsequently becomes associated with sampling period "n−1".

The long term information 304 may include long term rates or Ar values as determined using EQUATION 3 for a read miss rate (e.g., number of read misses/second), a pre-fetch rate (e.g., number of pre-fetches/second) and a write rate (e.g., number of writes/second). The long term information 304 may also include a time duration interval used for determining an adjusted Ar value for the current time or sampling period "n". For example, the time duration interval may represent the amount of time for which statistics are collected and used in connection with long term Ar values. An embodiment may store a set of long term Ar values rather than calculate such Ar values on demand from other stored information as in the case above for short term rates 320 (e.g., where short term information 302 is stored and used to calculate short term rates 320 on demand). Thus, in such an embodiment, the long term rates 330 may be included the long term information 304 where such long term rates 330 may be updated with each sampling period. In one embodiment with the arrival of a new sampling period "n", the long term information 304 may include Ar values for the foregoing statistics as determined using EQUATION 3 for a sampling period "n−1". These long term Ar values for "n−1" may each be multiplied by the time duration interval to determine $A_{n-1}$, an adjusted metric for the long term time period. The foregoing $A_{n-1}$ value may then be used with EQUATION 2 to determine An for the current sampling period "n" using a selected "r" as a long term decay coefficient. Using An, EQUATION 3 may then be used to obtain updated long term rates Ar values. With each new sampling period, the long term information may be accordingly updated so that which is associated with sampling period "n" subsequently becomes associated with sampling period "n−1".

With reference back to FIG. 10, described above is an activity bitmap 306 having an entry per sub extent where each such entry may indicate an aggregate or collective activity level with respect to all chunks of the associated sub-extent. The number of different activity level states that may be represented for each sub extent depends on the number of bits per entry of the activity bitmap. In one embodiment, each entry of the activity bitmap may be 2 bits as described above so that each entry may be an integer in the inclusive range of 0 . . . 3. Processing may be performed to decrement each entry having a non-zero value by 1 every predetermined time period, such as every 12 hours. Each time there is any I/O operation to a sub extent since the sub extent was located or moved to its current physical location, the sub extent's entry in the activity bitmap 306 may be set to 3. Thus, each entry in the bitmap may represent activity level information for up to 3 of the predetermined 12 hour time periods. An embodiment may also have a different number of bits per entry to represent a larger number of predetermined time periods. Based on the foregoing, the lower the value of a bitmap entry for a sub extent, the longer the amount of time that has lapsed since the sub extent has had any I/O activity.

Figure 12:
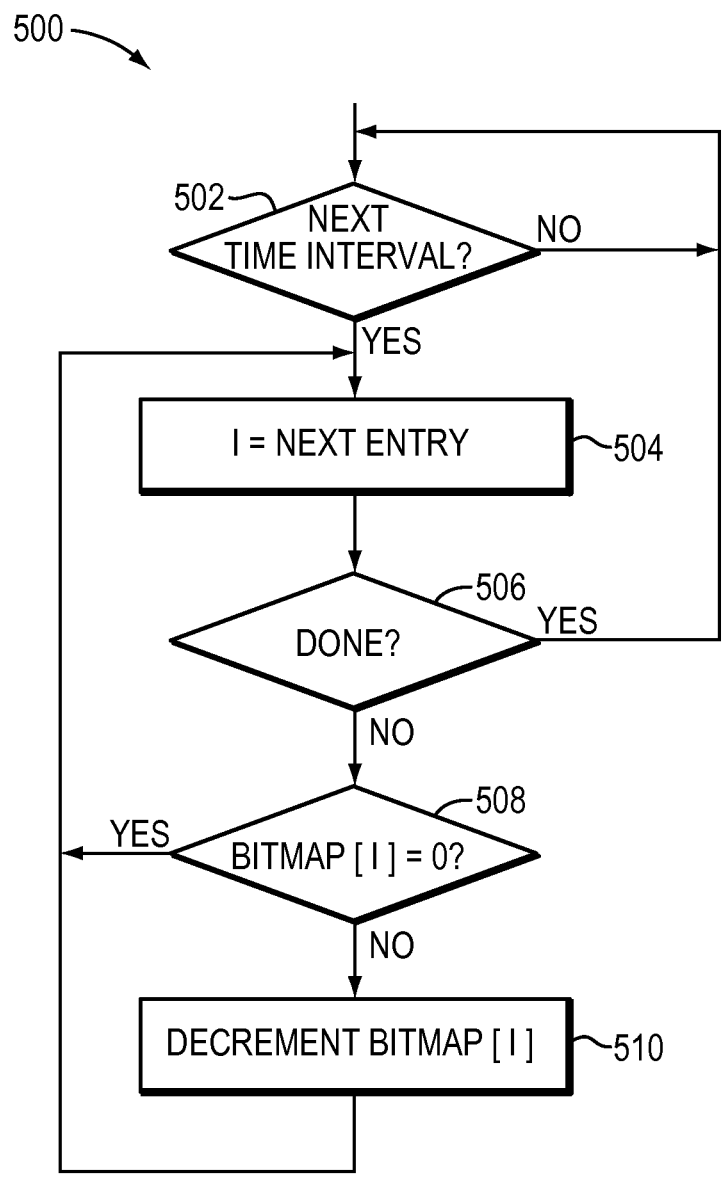
FIG. 12 is a flowchart of processing steps that may be performed in an embodiment in accordance with techniques herein.

Referring to FIG. 12, shown is a flowchart of processing steps that may be performed in connection with each activity bitmap associated with an extent in an embodiment in accordance with techniques herein. The flowchart 500 summarizes processing described above where each bitmap for each extent may be traversed with the occurrence of a predetermined time interval, such as every 12 hours. At step 502, a determination is made as to whether the next time interval has lapsed. If not, processing waits at step 502 until step 502 evaluates to yes and control proceeds to step 504. At step 504, I is initialized to the next entry in the bitmap. I represents a loop counter when traversing through the bitmap and denotes the bitmap entry currently selected for processing. At step 506, a determination is made as to whether the entire bitmap has been processed. If step 506 evaluates to yes, control proceeds to step 502 until an amount of time again lapses equal to that of the time interval. If step 506 evaluates to no, control proceeds to step 508 where a determination is made as to whether the current bitmap entry (e.g. bitmap [I]) is zero. If so, control proceeds to step 504. Otherwise, control proceeds to step 510 where the current bit map entry is decremented by one (1) and control proceeds to step 504 to process the next entry in the bitmap.

The activity bitmap may be used in connection with determining an activity level associated with each sub extent, the smallest amount of data that can be associated with a data movement operation to relocate data from one physical device to another. It should be noted that an embodiment may have functionality and capability to physically move data in units or amounts less than a sub extent. However, when performing processing to determine data movement candidates, such as by the optimizer, such processing may consider candidates for data movement which have a minimum size of a sub extent. That is, all data of the sub extent may be either moved or relocated as a complete unit, or remains in its current location. In connection with a sub extent when performing a data movement, it may be that not all chunks of the sub extent are actually moved. For example, suppose a sub extent is 10 chunks and the sub extent is to be moved from a first storage tier, such as from SATA or FC, to a second storage tier, such as flash. It may be that 9/10 chunks of the sub extent are unallocated or already in flash storage with only 1 chunk stored in the first storage tier. In this case, processing only needs to actually move the single chunk from the first storage tier to flash since the remaining 9 chunks are either already in the flash tier or unallocated. With a sub extent, the amount of data actually moved may be at most the size of the sub extent but may be less depending on, for example, whether all chunks of the thin device sub extent are allocated (e.g., actually map to physical storage), depending on the current physical device upon which chunks of the sub extent are located prior to movement, and the like. It should be noted that chunks of a sub extent may be located in different storage tiers, for example, depending on where the chunk's data is stored such as at the time when written as well as the result of other conditions that may vary with embodiment.

As an example use of the activity bitmap is in connection with promotion and demotion. As an example use of the activity bitmap, the bitmap may be used to determine selective sub extents which exhibit the highest activity level such as those having counters=3 (e.g., "hot" or active areas of the extent). These sub extents may be candidates for promotion or data movement to a higher performing storage tier and may be given preference for such promotion and data movement over other sub extents having activity bitmap entries which are less than 3. In a similar manner, the activity bitmap may be used to identify the "coldest" or inactive sub extents. For example, sub extents having bit map entries=0 may be candidates for demotion to a lower performing storage tier.

In connection with promotion data movements, an embodiment may want to be responsive to a change in workload with respect to the short term. With demotion, an embodiment may not want to move data as quickly as with promotion and may also want to consider longer term workloads prior to moving such data to a lesser performing storage tier. With promotion, an embodiment may give greater weight to ST workload and activity data. With demotion, an embodiment may additionally consider LT workload and activity rather than just such ST information.

The information as described and illustrated in FIGS. 10-12 above may be used for a variety of different purposes and evaluations. For example, an embodiment may use one or more of the short term rates to identify one or more active extents based on such aggregated extent-level activity data. Subsequently, once an active extent is identified such as a candidate for promotion, the extent's activity bitmap may be examined to determine which sub extents are most active. Processing may be performed to selectively move some of the sub extents of the active extent (e.g., those with counters=3) to a higher performing storage tier.

As another example, the activity bitmaps of extents may be used to determine a promotion ranking used to identify which extent may be promoted prior to one or more other extents. To further illustrate, an embodiment may have two extents, both which are candidates for promotion. The two extents may exhibit similar activity levels based on aggregate extent-level information such as based on short term rates 320 for each extent. The extent having the lesser number of active sub extents may have a higher priority for movement than the other extent. For example, processing may be performed to count the number of non-zero bit map entries for each of the two extents. The extent having the lower count may have a higher priority than the other extent having a higher count. In other words, the extents may be ranked or ordered for promotion based on a number or count of non-zero bit map entries. The extent having the lower count may be characterized as also exhibiting the greatest activity level density based on the foregoing counts of the activity bitmaps.

As another example in connection with demotion, an embodiment may use one or more of the short term rates 320 in combination with one or more of the long term rates 330 to identify one or more inactive extents based on such aggregated extent-level activity data. Subsequently, once an inactive extent is identified, the extent's activity bitmap may be examined to determine which sub extents are inactive and should be demoted rather than automatically demoting all sub extents of the inactive extent. Processing may be performed to selectively move some of the sub extents (e.g., those with counters=0, counters less than some threshold such as 1, and the like) to a lower performing storage tier.

One embodiment in accordance with techniques herein may include multiple storage tiers including a first tier of flash devices and one or more other tiers of non-flash devices having lower performance characteristics than flash devices. The one or more other tiers may include, for example, one or more types of disk devices. The tiers may also include other types of SSDs besides flash devices.

The different levels of activity information described herein as obtained at a thin device level, extent level, and sub extent level provide a hierarchical view for characterizing activity of different portions of thin devices. Activity information at higher device levels may be used to first identify devices which may be candidates for data movement, such as between storage tiers (e.g. for promotion and/or demotion). In connection with thin devices, once such a first device is identified, additional detail regarding the first device's activity as reflected in extent activity level information may be used to identify an extent of the first device as a candidate for data movement. Subsequently, the activity bitmap for the extent identified may then be used to determine one or more sub extents of the identified extent for data movement. The techniques herein may be used for collecting and tracking activity of thin devices. Use of the decay coefficients and equations for determining adjusted activity levels to account for previous activity levels provides an effective way of tracking workload and activity over time without having to keep a large database of historical statistics and metrics for long and short time periods.

In addition to the activity information described above for each extent and sub extent of a thin device, an embodiment may also track device level activity information for logical devices (e.g., thin devices, LVs, and the like) and physical devices in a data storage system as also noted. Additionally, an embodiment may track activity information for thin device pools. When a DA or other device interface services an I/O, the DA may not typically have any knowledge regarding thin devices as may be known from the host's point of view. In connection with collecting data for use with techniques herein, each DA may be provided with additional mapping information regarding thin devices and where storage for the thin devices is allocated (e.g., such as described by the allocation map). The DA may use this information to determine what thin device (if any) is associated with a given back-end I/O request. When the DA is servicing a back-end I/O request, the DA may record information about the I/O including information about the thin device associated with the I/O request. Such additional information about the thin device may be used in order to perform statistics collection of activity data for the thin devices in accordance with techniques herein.

In addition to the statistics and activity data described above, an embodiment may also collect and store information regarding expected I/O size information for each extent, thin device (or other logical device), physical device, and the like. Such information may be determined in any one or more suitable ways in an embodiment. For example, an embodiment may determine expected I/O sizes that represent the average size with respect each of the particular types of I/O operations for which statistics are collected. In connection with the embodiment herein, the types of I/O operations for which statistics are collected may be as described above for read miss or random read miss (RRM), pre-fetch (P) or sequential read miss (SRM), and write (W). In a manner similar to that as described elsewhere herein for other statistics, the average I/O sizes may be determined based on size information collected for observed I/O operations. The collected size information based on observed I/Os may be used in determining or modeling expected I/O sizes in connection with equations, such as EQUATION 4, described elsewhere herein when determining various scores. For example, an embodiment may determine a first average I/O size based on I/O sizes of write operations observed for a time period, a second average I/O size based on I/O sizes for SRM operations for a time period, and a third average I/O size based on I/O sizes for RRM operations for a time period. The foregoing average I/O sizes may be tracked with respect to each extent and other levels (e.g., thin device, physical device, etc) in a manner similar to that as described above such as in FIG. 10 for other statistics. An embodiment may also use other approaches which may be further simplified. For example, rather than track such I/O size information for each extent, an embodiment may determine an average I/O size with respect to each particular type of I/O operation (W, RRM and SRM) as an aggregate across one or more devices, such as for a physical device, pool of physical devices, thin device, and the like, and then determine an average I/O size with respect to all extents or data portions thereof. In one embodiment, the expected I/O size for any desired I/O operation type such as used in connection with EQUATIONs 4 and 5 described elsewhere herein, may be computed as an average I/O size based on previously gathered data including metrics related to total amount of data (in bytes, megabytes, or other size unit) for a given time period and total number of I/O operations (for the time period over which the total amount of data is determined). More formally, the average I/O size used as an expected I/O size for a given I/O type may be represented as:

Ave size for given I/O type=TOTAL_DATA_TRANSFER/TOTAL_OPS    EQUATION 3A where

"Ave size for given I/O type" is the average or expected I/O size for a given I/O operation type (e.g., Read, Write, Read miss, etc.);

"TOTAL_DATA_TRANSFER" is the total amount of data (e.g., in bytes, megabytes or other size unit) for the desired I/O operation type for a given time period; and "TOTAL_OPS" is the total number of I/O operations observed during the time period for which the TOTAL_DATA_TRANSFER is observed.

It should be noted that EQUATION 3A is one way in which an embodiment may estimate that averages as may be used in connection with expected I/O sizes as described elsewhere herein. Another way an embodiment may determined average I/O sizes is based on a an equation using weighted averages, using information as may be gathered using the allocation map as described elsewhere herein (e.g., to gather information for data portions based on I/Os directed to the physical device where such data portions are stored), and more generally any suitable technique.

In connection with techniques in following paragraphs, the extent-based short term and long term statistics or metrics as described in FIG. 10 may be used in determining scores indicating the activity of extents. In one embodiment, the score may be a weighted value based on a combination of all six metrics 322, 324, 326, 332, 334 and 336 of FIG. 10 although an embodiment may generally use any metrics in determining such scores. In an embodiment herein, a promotion score for an extent may be represented in EQUATION 4 as:

$$((P1*P7*s\_rrm)+(P2*P8*s\_w)+(P3*P9*s\_p)+\\(P4*P10*l\_rrm)+(P5*P11*l\_w)+(P6*P12*l\_p))/\text{(\# Active Subext+1)}$$

where s_rrm is the rate of short term random read misses (322), s_w is the rate of short term writes (324), s_p is the rate of short term pre-fetches or SRMs (326), l_rrm is the rate of long term random read misses (332), l_w is the rate of long term writes (334), and l_p is the rate of long term pre-fetches or SRMs. The coefficients P1-P12 may be set as appropriate and are described in more detail elsewhere herein. It should be noted that "#Active Subext" represents the number of active subextents or subportions of an extent or other larger data portion for which the score is being determined. Examples of evaluating when a subextent or other subportion is active are described elsewhere herein. It should be noted that metrics used in connection with determining promotion and/or demotion score may take into account I/O size.

The coefficients P1-P6 may represent weights assigned to the different operation types denoting how much weight is given to each particular operation type (e.g., which of random read miss (RRM), pre-fetch (P) or sequential read miss (SRM), write (W)) and the long term and short term variants of expected rates at which such operation types are expected (e.g., predicted or modeled) to occur in the future. In one aspect, the coefficients P1 and P4 represent the weighted preference given to the RRM operation type relative to the other operations types of SRM (or P) and W. In particular, P1 represents the weighted preference given to the short term operation count or rate for the RRM operation type and P4 represents the weighted preference given to the long term operation count or rate for the RRM operation type. In a similar manner, the coefficients P2 and P5 represent the weighted preference given to the W operation type relative to the other operations types of SRM (or P) and RRM. In particular, P2 represents the weighted preference given to the short term operation count or rate for the W operation type and P5 represents the weighted preference given to the long term operation count or rate for the W operation type. Furthermore, the coefficients P3 and P6 represent the weighted preference given to the P or SRM operation type relative to the other operations types of W and RRM. In particular, P3 represents the weighted preference given to the short term operation count or rate for the P or SRM operation type and P6 represents the weighted preference given to the long term operation count or rate for the P or SRM operation type. The weights or coefficients P1-P6 may be generally referred to as operation type weights. In some embodiments, values for P1-P6 may be dynamically selected each time a new set of statistics or metrics (e.g., 320 and 330 of FIG. 10) are utilized in performing processing described herein. Values for P1-P6 may be generally selected based on expected storage tier workload characteristics and particular performance characteristics of physical drives in the different tiers. Examples of how values for P1-P6 may be selected are described in more detail elsewhere herein. It should be noted that an embodiment may also use a combination of fixed values for P1-P6 when determining a score in connection with evaluating which data portions to store in one or more of the storage tiers and may use dynamically determined values for P1-P6 when determining a score in connection with evaluating which data portions to store in one or more others of the storage tiers. For example, an embodiment may use dynamically selected values for P1-P6 when determining a promotion score of EQUATION 4 for use when evaluating which data portions to store in a target high performing SSD or flash-based storage tier, and may otherwise use a same set of fixed values for P1-P6 when determining a promotion score of EQUATION 4 for use when evaluating which data portions to store in a non-SSD or non-flash-based storage tiers (e.g., storage tiers comprising rotational disk drives). In an embodiment, the fixed values used for P1-P6 for non-SSD-based tiers may be 12, 4, 4, 3, 1, and 1, respectively. Of course, different values may be used to emphasize or deemphasize different I/O characteristics in connection with determination of the promotion raw score. Thus, different values for weights P1-P6 may be selected for use depending on which target tier the promotion score is being calculated for. Such values may be dynamically and continually determined based on current expected workload characteristics of a storage tier at different points in time. An embodiment may also selected weights for P1-P6 which are fixed or static throughout operation and performance of the techniques herein where such a fixed set of the same weights may be used for one or more storage tiers.

The coefficients P7-P12 may represent additional weights assigned or associated with each particular variant combination of operation type (e.g., RRM, SRM or P, and W) and short term or long term for each operation type. Generally, the coefficients P7-P12 may represent weighting factors that may be characterized as varying with, dependent on, or a function of, expected I/O size for the three different operation types of RRM, SRM or P, and W. In particular, P7 and P10 represent weighting factors that vary with, or are a function of, expected I/O size for the RRM operation type. P8 and P11 represent weighting factors that vary with, or are a function of, expected I/O size for the W operation type. P9 and P12 represent weighting factors that vary with, or are a function of, expected I/O size for the P or SRM operation type. Weights P7-P12 may also be referred to herein as I/O size or data transfer weights. As noted above, EQUATION 3A is one way in which the expected I/O size may be determined for use in connection with determining such weights. It should also be noted that as a variation to the above where in one embodiment, size weights as represented using P7-P12 may be applied to only the short term metrics (e.g., always use a size weight of 1 for weights P10, P11 and P12 for long term metrics).

In some embodiments, values for P7-P12 may be dynamically selected each time a new set of statistics or metrics (e.g., 320 and 330 of FIG. 10) are utilized in performing processing described herein. Values for P7-P12 may be generally selected based on expected storage tier workload characteristics and particular performance characteristics of physical drives in the different tiers. For example, as described in more detail elsewhere herein, if particular storage tiers have physical drives where a response time or other measurement of performance does not exhibit a substantial dependency upon I/O size, then values for P7-P12 may be 1 so as not to introduce any bias based upon expected I/O sizes for the different operation types. Examples of how values for P7-P12 may be selected are described in more detail elsewhere herein. It should be noted that an embodiment may also use fixed values for P7-P12 when determining a score in connection with evaluating which data portions to store in one or more of the storage tiers and may use dynamically determined values for P7-P12 when determining a score in connection with evaluating which data portions to store in one or more others of the storage tiers. For example, an embodiment may use dynamically selected values for P7-P12 when determining a promotion score of EQUATION 4 for use when evaluating which data portions to store in a target high performing SSD or flash-based storage tier and may otherwise use a set of fixed values for P7-P12 of 1 for all of P7-P12 when determining a promotion score of EQUATION 4 for use when evaluating which data portions to store in a non-SSD or non-flash-based storage tiers (e.g., storage tiers comprising rotational disk drives). Of course, different values may be used to emphasize or deemphasize different I/O characteristics in connection with determination of the promotion raw score. Thus, different values for weights P7-P12 may be selected for use depending on which target tier the promotion score is being calculated for.

Values of P7-P12 may be selected as a function of expected I/O sizes for the different operation types. For example, P7 and P10 may be determined as a function of the expected I/O size of the RRM operations with respect to the extents for which the promotion score is being determined. P8 and P11 may be determined as a function of the expected I/O size of the W operations with respect to the extents for which the promotion score is being determined. P9 and P12 may be determined as a function of the expected I/O size of the SRM or P operations with respect to the extents for which the promotion score is being determined.

Values for P7-P12 may be based on each storage tier and drive technology depending on the sensitivity of response time to I/O size. Thus, the drive technology may be used in selecting that particular values for P7-P12 such as using curves of FIGS. 13D and 13E where the more sensitive or greater dependency between response time and I/O size, the greater the variation in values of the bias or weights assigned.

The demotion score for an extent may be represented in EQUATION 5 as:

$$(P4*P10*s\_rrm)+(P5*P11*s\_w)+(P6*P12*s\_p)+ \\ (P1*P7*l\_rrm)+(P2*P8*l\_w)+(P3*P9*l\_p)$$

where s_rrm, s_w, pl, etc. are as set forth above.

As noted above in connection with the exemplary EQUATIONS 4 and 5 for computing, respectively, the promotion and demotion scores, the same set of coefficients may be used. Alternatively, an embodiment may, however, use a different set of coefficients for computing the promotion and demotion scores.

In a multi-tiered data storage system as described herein, an application having its data stored on thin devices of a storage group may be allowed to use multiple tiers of storage. In order to be able to use the storage of the tiers efficiently and also move a minimal number of chunks between tiers, chunks which are the most active or "hot" need to be located in the higher tiers (e.g., promoted to such tiers if not already located there) and chunks which are least active or "cold" need to be located in lower storage tiers (e.g., demoted to such tiers if not already located there). After identifying the hot and cold chunks, processing may be performed to determine how much of the hot chunks should be placed in the different storage tiers in order to efficiently utilize the higher performing tiers, such as flash tiers, while also avoiding overloading any given tier with I/O request or I/O transfer activity to the point that overall performance (e.g., across all tiers in the AP, across one or more SGs, for the whole data storage system, and the like with respect to the physical devices under consideration) would have been better had less of the workload been placed in the tier. In connection with the foregoing, techniques are described in following paragraphs which determine promotion and demotion thresholds of a data movement policy that may be associated with one or more SGs. The data movement policy as described herein in the context of thin devices affects what data portions of thin devices are data movement candidates and may be moved to another tier. The selection of promotion and demotion thresholds may be made by considering criteria including performance limits (e.g., response time, number of I/Os per time period, and the like) and capacity limits. The performance limits may be flexible or adaptable and specified for each storage tier. The capacity limits may also be specified for each storage tier and may include capacity limits included in an AP for the affected one or more SGs. The techniques model response time of target storage tiers when evaluating different alternative hypothetical considerations in which performance limits are varied for each tier when selecting promotion and demotion thresholds. The different sets of performance limits in combination with capacity limits are evaluated by modeling the expected target tier performance and then determining an overall performance metric representing an aggregate modeled performance metric across all target storage tiers for all affected SGs. In one embodiment, the overall performance metric may be an average response time determined with respect to all target storage tiers using the modeled response time as determined for each such tier. The average response time is used to compare the overall modeled performance for the storage tiers when evaluating different sets of performance limits for each target tier. Each set of performance limits specified for multiple tiers may be used as a way to provide weighting factors for I/O workload distribution across the tiers in order to reflect the performance differences of the different tier storage technologies. Utilizing such "what if" analysis to evaluate different sets of performance limits coupled with capacity limits provides for determining promotion and demotion thresholds that may be used by the DA, or more generally, other backend data storage system components, in connection with performing data movements in accordance with workload or performance impact across all target storage tiers to increase overall performance.

In connection with techniques herein as mentioned above, response time may be considered as performance criteria alone, or in combination with other performance criteria in combination with capacity limits, when determining promotion and demotion thresholds affected what data portions of a thin device may be moved between physical storage devices in different storage tiers. The techniques herein consider different performance characteristic information and curves that may vary with each storage tier, type of physical device, device vendor, and the like. In particular, performance curves for the different storage tiers may be determined and used to model target tier and also overall SG performance across storage tiers as part of processing to evaluate different sets of performance limits in combination with capacity limits. As an example, consider a workload of N I/O operations/second. The response time experienced for the same workload varies with storage tier due to the underlying capabilities of each tier's technology. As such, performance curves may be used in connection with techniques herein to model expected response times if a particular data movement is performed in accordance with candidate promotion and demotion thresholds.

Figure 13:
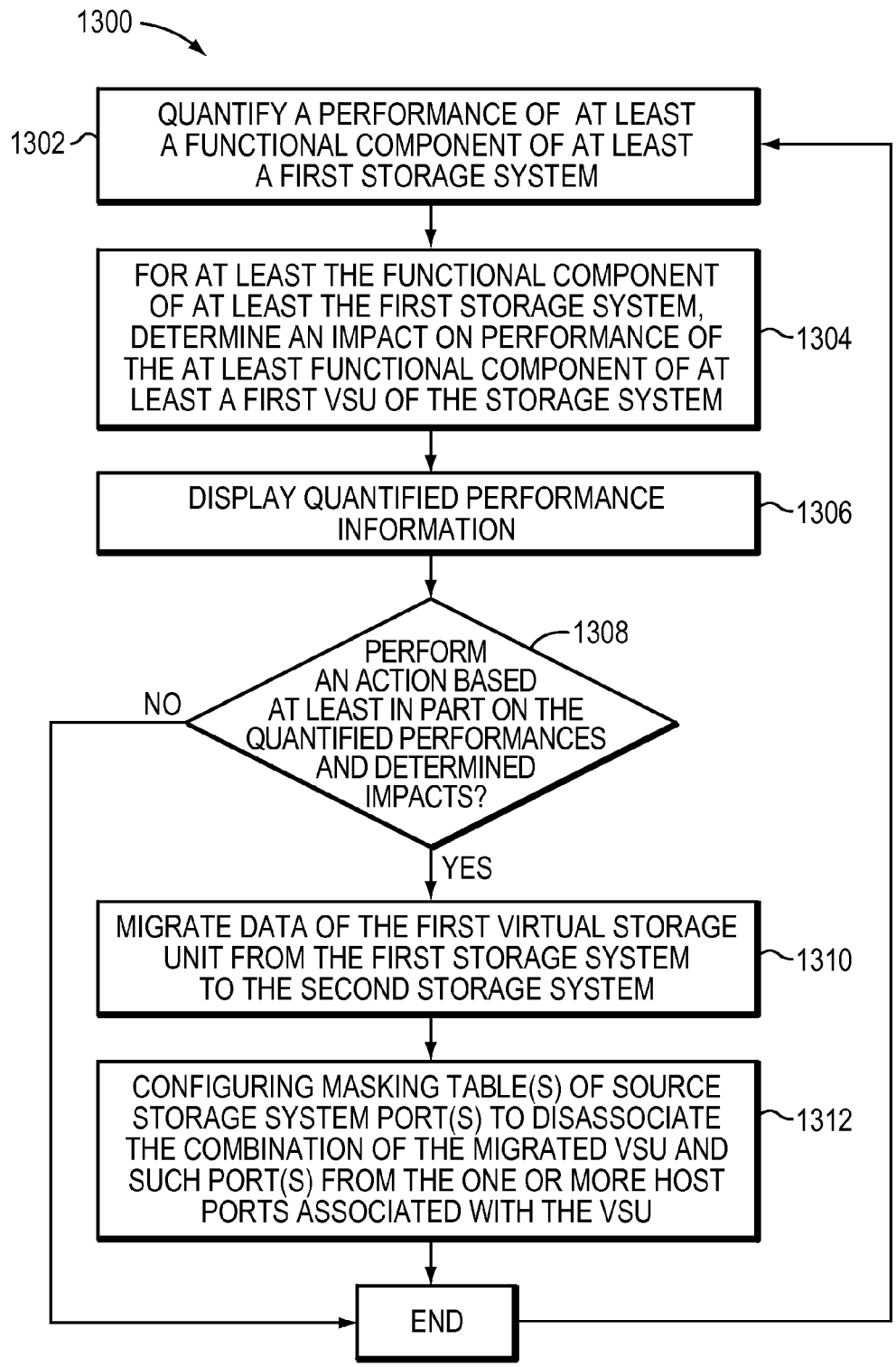
FIG. 13 is flowchart illustrating an example of a method 1300 of intelligently migrating a VSU from a source data storage system to a target data storage system, in accordance with some embodiments of the invention.

FIG. 13 is flowchart illustrating an example of a method 1300 of intelligently migrating a VSU from a source data storage system to a target data storage system. Method 1300 is merely an illustrative embodiment of a method of intelligently migrating a VSU from a source data storage system to a target data storage system, and is not intended to limit the scope of the invention. Any of numerous other implementations of intelligently migrating, for example, variations of method 1300, are possible and are intended to fall within the scope of the invention. Further, acts of method 1300 may be performed in relation to other methods, for example, as part of monitoring the performance of a data storage system, or as part of deciding whether to perform another action, for example, re-allocating storage space or moving data between storage tiers. Method 100 may include implementing one or more aspects of a technology developed by EMC referred to by some as FAST "Sideways."

In act 1302, a performance of at least one functional component of at least a first data storage system is quantified. For example, for a first data storage system, the performance of the system as a whole and/or one or more of its functional components may be quantified. The performance may be quantified using any of a variety of known metrics, or any of the metrics described herein, and may take into account any of a variety of criteria, including, but not limited, to utilizations (i.e., workloads) and response times. In some embodiments, determining a performance may include determining whether at least a system component (i.e., the data storage system overall or a functional component thereof) is overloaded. Determining whether at least a system component is overloaded may include determining whether one or more measured values of performance criteria are greater than a threshold value (e.g., 70% of capacity) for the performance criteria for a threshold frequency (e.g., 20% of the time) during a measurement period—i.e., during a certain percentage of measurement intervals of a measurement period for which performance is measured. For example, it may be determined that at least a system component is overloaded if at least the system component exceeds 70% of performance capacity 20% of the time during a four-hour measurement period.

In some embodiments, in a computer system having a plurality of data storage systems, the performance of at least a component of two or more of the data storage system may be quantified. For example, it may be desirable to monitor overall computer system performance and/or to determine which data storage systems are overloaded and which are candidate target systems for a migration of a VSU. The performance values calculated for two or more data storage systems may be considered when playing out one or more "what if" scenarios in determining source systems, target systems and timing of a migration, as is described in more detail herein.

In 1304, for at least the functional component of at least the first data storage system, an impact on performance of the at least functional component of at least a first VSU of the data storage system may be determined. For example, in response to determining that at least a component of a data storage system is overloaded, the impact that one or more VSUs has on the overloaded functional component and/or system overall may be quantified. Such determination may be made using any of a variety of techniques, for example, using method 1400 illustrated in FIG. 14, which will now be described.

Figure 14:
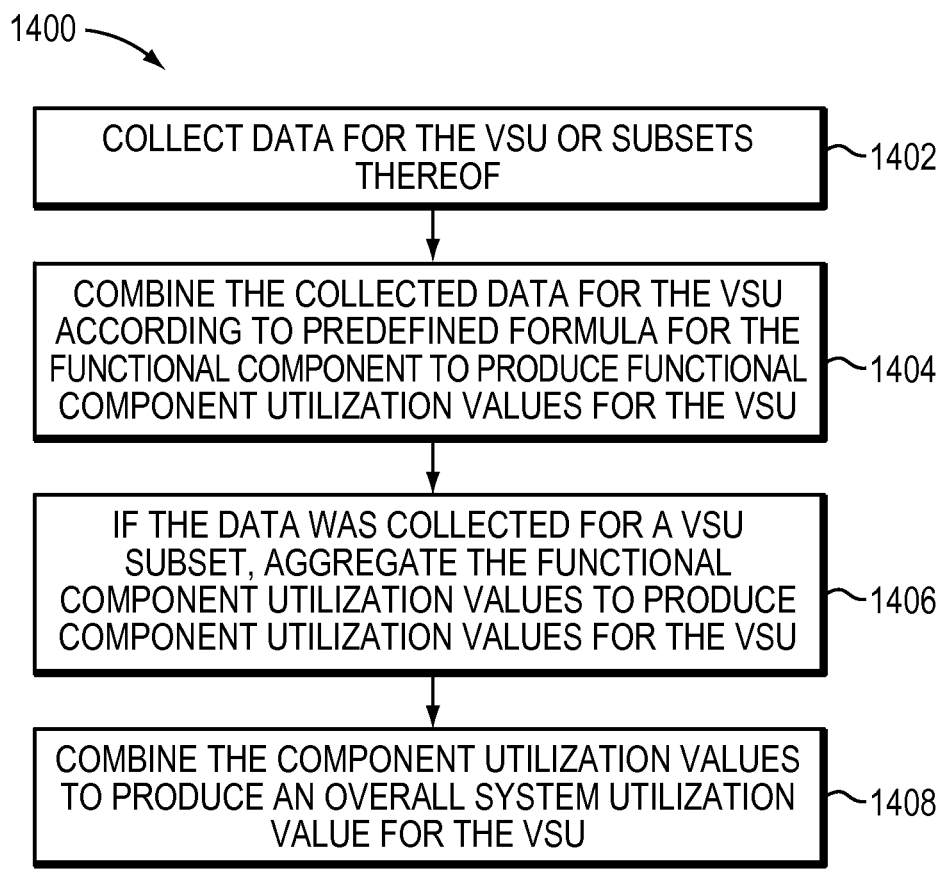
FIG. 14 is flowchart illustrating an example of a method 1 of determining an impact on performance of at least a functional component of a data storage system by at least a first VSU of the data storage system, in accordance with some embodiments of the invention.

FIG. 14 is flowchart illustrating an example of a method 1400 of determining an impact on performance of at least one functional component of a data storage system by at least a first VSU of the data storage system. Method 1400 is merely an illustrative embodiment of determining an impact on performance of at least one functional component of a data storage system by at least a first VSU of the data storage system, and is not intended to limit the scope of the invention. Any of numerous other implementations of determining such an impact, for example, variations of method 1400, are possible and are intended to fall within the scope of the invention. Quantifying an impact on performance of a VSU on at least a component of a data storage system may include determining a utilization value (i.e., a "score") of at least the component, an example of which will now be described.

In act 1402, data for the VSU or subsets thereof may be collected. For example, I/O operation counts for various type of I/O operations, specific for the VSU, may be tallied. The I/O operation type counts may be collected and tallied using any of a variety of known techniques or as described herein, for example, techniques described above in relation to performing storage optimizations, and as described in U.S. patent application Ser. No. 13/435,415, titled "Techniques for Automated Discovery and Performing Storage Optimizations on a Component External to a Data storage system," filed Mar. 30, 2012 ("the '415 Application"), the contents of which are hereby incorporated by reference in its entirety.

In some embodiments, data collection may occur at a lower logical storage level than the level of the VSU for which a utilization score is being determined, and the collected data may need to be aggregated into a tally for the higher level VSU. For example, even though the VSU for which utilization is being quantified may be a storage group (SG), thin device or logical volume (LV), data may be collected at the thin device, LV, extent, sub-extent or chunk level, and the counts for these lower levels aggregated together for a next higher level, and the totals for the next higher level may be tallied together for a yet higher level, etc. For example, if a utilization score is being tallied for an SG, the total I/O operation counts for each chunk belonging to the SG may be counted and the counts from such chunks may be tallied for their respective sub-extents to produce sub-extent totals; the sub-extent totals may be tallied for their respective extents to produce extent totals; the extent totals may be tallied for their respective LVs to produce LV totals, the LV totals may be tallied for their respective thins devices to produce thin device totals; and the thin device totals may be tallied for their respective SGs to produce SG count totals. The further dimension of storage tiers also may be added to counting I/O operations, for example, as described above in relation to performing storage optimizations and in the '415 Application.

Further, as described below in relation in act 1406, utilization scores may be determined at lower logical storage levels than the level of the VSU for which the utilization score ultimately is being determined, and scores of sub-levels may be combined. The logical storage levels at which adding count totals stops and combining utilization scores begins may be configured, taking into account many factors, including, but not limited to, the desired granularity of visibility, the desired granularity of action (e.g., movement, allocation or migration) and the computation cost of counting and combing counts and scores, respectively.

In act 1404, the collected data for the VSU may be combined according to predefined formula for the functional component to produce component utilization values. In some embodiments of the invention, the impacts of different types of I/O operations may be taken into account when quantifying a utilization of a VSU. Different types of I/O operations may include, but are not limited to: random read hit, random read miss, sequential read hit, sequential read miss (e.g., in connection with a pre-fetch operation), random write hits, random write miss, sequential write hit, sequential write miss, and pre-fetches (e.g., as a specific type of operation that results in a sequential read from storage). As used herein, a "hit" means that a requested I/O operation is satisfied by the cache of the data storage system, such that the requested I/O operation does not have to be performed on the non-volatile storage medium (e.g., disk or flash drive) on which the requested data resides. As used herein, a "miss" means that a requested I/O operation is not satisfied by the cache of the data storage system, such that the requested I/O operation has to be performed on the non-volatile storage medium on which the requested data resides.

For example, for each VSU, for each I/O operation type, a number of occurrences of the I/O operation type for a functional component may be counted over a period of time to produce an I/O operation type count value. These I/O operation type count values then may be combined in any of a variety of ways as part of determining a utilization value of a VSU for a functional component. For example, the count values may be added together, and in some embodiments, each count value may be weighted by a weighting factor, as described in more detail below.

For different functional components, different combinations of I/O count types may be used, depending on the relative impacts that the I/O operation have on utilization of the functional components being measured. In some cases, an I/O operation type may have no bearing on the utilization of a functional component, and accordingly may not be used at all. For example, an I/O hit on a data storage system cache will not impact utilization of back-end adapters or physical storage units, and so I/O hits counts may not be used at all in determining a utilization score of a back-end adapter or PSU.

In some embodiments, weighting factors may be applied to one or more of the I/O operation type counts. Such weighting factors may be configured to reflect the relative impact the different types of I/O operations have on the functional component for which a utilization value is being determined. For example, because write operations utilize more storage resource than read operations, in the front-end, back-end and in PSUs, weighting factors for hit or miss write operations may be given a higher value than weighting factors for hit or miss read operations, respectively. Several other factors may contribute to the values selected for the weighting factors such as, for example, empirical data as to the impact of I/O operations on performance of a functional component or data storage system as a whole, and the particular needs or desires of one or more entities for whom data is stored on the data storage system.

In some embodiments of the invention, an amount of storage (e.g., an average amount of storage over a period of time) allocated to a VSU may be taken into account in quantifying a utilization by a VSU. For example, a scaling factor reflecting the allocated storage amount may be applied. A value of the scaling factor may be configured such that there is an inverse relationship between the value of the scaling actor and the amount of storage allocated—i.e., the scaling factor increases as the amount of allocated storage decreases and vice versa. In this manner, a "density" of the I/O operations performed for the VSU can be taken into account—i.e., a relationship between the number of I/O operations and the amount of storage allocated. For example, 5000 I/O operations per hour for a VSU having 1 TB of storage capacity presents a much denser I/O density profile than 5000 I/O per hour for a VSU having 10 TB of storage capacity.

In some embodiments of the invention, an average size of I/O operations over a period of time may be taken into account in quantifying a utilization by a VSU. For example, a scaling factor reflecting the average size of I/O operations may be applied. A value of the scaling factor may be configured such that the utilization value of the VSU increases as the average I/O operation size increases, reflecting that greater I/O size means greater utilization of system resources, and vice versa.

In some embodiments, a storage scheme of the data storage system may be taken into account. For example, a scaling factor based on a storage scheme may be configured to reflect a storage scheme (e.g., a RAID level) employed by the data storage system. A value of the storage scheme factor may be configured to reflect that some storage schemes result in greater utilization of system resources than others.

The following EQUATION 6 is an illustrative example of an equation that may be applied in quantifying utilization of an FA by a VSU:

$$U_{FA}=[(F_{RH}*RH+F_{SR}*SR+F_{RM}*RRM+F_{WH}*WH+F_{SW}*SW+F_{WM}*WM)*F_{IOS}]/SIZE \qquad \text{EQUATION 6:}$$

where:
RH=the number of read hits;
SR=the number of sequential read misses
RRM=the number of random read misses
WH=the number write hits;
SW=the number of sequential write misses
WM=the number of random write misses
$F_{RH}$=an RH weighting factor;
$F_{SR}$=an SR weighting factor;
$F_{RM}$=an RRM weighting factor;
$F_{WH}$=a WH weighting factor;
$F_{SW}$=an SW weighting factor;
$F_{WM}$=a WM weighting factor;
$F_{IOS}$=an I/O size scaling factor; and
SIZE=the average amount of storage allocated to the VSU during the measurement period.

In some embodiments, $F_{IOS}$=square-root(Si/8 KB), where Si=the average size of an I/O operation for the VSU over a period of time, and, in some embodiments, the following weighting factors may be used: $F_{RH}$=1; $F_{SR}$=1; $F_{RM}$=1.5; $F_{WH}$=2; $F_{SW}$=2; and $F_{WM}$=4. It should be appreciated that any of a variety of other combinations of weighting factor values may be used.

The following EQUATION 7 is an illustrative example of an equation that may be applied in determining a utilization score of a BE by a VSU:

$$U_{BE}=[(F_{SR}*SR+F_{RM}*RRM+F_{SW}*SW+F_{WM}*WM*(\text{storage\_scheme\_factor}))*F_{IOS}]/SIZE \qquad \text{EQUATION 7:}$$

In some embodiments, $F_{IOS}$=square-root(Si/8 KB), where Si=the average size of an I/O operation for the VSU over a period of time, and, in some embodiments, the following weighting factors may be used: $F_{SR}$=1; $F_{RM}$=1; $F_{SW}$=2; and $F_{WM}$=4. Further, the value of storage scheme factor may be configured according to the RAID level of the data storage system, for example, RAID Level 1 (i.e., RAID-1) 1=2, RAID Level 5 (RAID-5)=5, RAID Level 6 (RAID-6)=8, reflecting that RAID-6 results in greater utilization of a BE than RAID-5, and RAID-5 results in greater utilization than RAID-1. It should be appreciated that any of a variety of other combinations of storage scheme factor values may be used, and that criteria other than RAID level may be used to define the relative weighting values.

In some embodiments, EQUATION 7 also may be employed to determine a utilization score, $U_{PSU}$, of a PSU by a VSU, but it should be appreciated that other formulas may be used.

In act 1406, if the data was collected for a VSU subset, the functional component utilization values may be combined (e.g., added together) to produce functional component utilization values for the VSU. In some embodiments, utilization scores may be determined at a lower logical storage level than the level of the VSU for which an utilization score ultimately is being determined, and the utilization scores may need to be combined into a utilization score for the higher level VSU. For example, even though the VSU for which utilization is being quantified may be a storage group (SG), thin device or logical volume (LV), utilization scores may be determined at the thin device, LV, extent, sub-extent or chunk level, and these scores combined for a next higher level, and the scores for the next higher level may be combined for a yet higher level, etc. For example, if a utilization score is being tallied for an SG, a utilization score may be determined for each chunk belonging to the SG, and may be combined to produce a chunk score and the chunk scores from such chunks may be combined for their respective sub-extents to produce a sub-extent score; the sub-extent scores may be combined for their respective extents to produce extent scores; the extent scores may be combined for their respective LVs to produce LV scores, the LV scores may be combined for their respective thins devices to produce thin device scores; and the thin device scores may be combined into their respective SGs to produce SG count scores. In some embodiments, combining scores at the various logical storage levels includes adding the scores. The further dimension of storage tiers also may be added to combining scores, for example, as described above in relation to performing storage optimizations and in the '415 Application.

The logical storage levels at which adding count totals stops and combining utilization scores begins may be configured, taking into account many factors, including, but not limited to, the desired granularity of visibility, the desired granularity of action (e.g., movement, allocation or migrations) and the computation cost of counting and combing counts and scores, respectively.

In act 1408, the component utilization values may be combined to produce an overall system utilization value for the VSU. For example, the component utilization values may be combined according to the following EQUATION 8:

$$U_{SYS}=F_{FA}*U_{FA}+F_{BE}*U_{BE}+F_{PSU}*U_{PSU} \qquad \text{EQUATION 8:}$$

where:

$F_{FA} = a\ U_{FA}$ weighting factor;
$F_{BE} = a\ U_{BE}$ weighting factor; and
$F_{PSU} = a\ U_{PSU}$ weighting factor.

The values of $F_{FA}$, $F_{BE}$ and $F_{PSU}$ may be selected to reflect the relative significance of each to the component utilization values to the performance of the system as a whole. In some embodiments, each of these weighting factors may be set equal to 1, so that none of utilization values is given any greater or lesser weight than any other in determining an overall system utilization score of a VSU. It should be appreciated that any of a variety of other combinations of weighting factor values may be used.

Returning to method 1300, it should be appreciated that act 1304, and/or any acts of method 1400 may be performed for multiple storage arrays of a computer system.

In act 1306, performance information may be displayed. For example, determined impacts (e.g., utilization scores) of VSUs for functional components of a data storage system, and the data storage system overall, may be displayed in a manner that assists a user in determining the relative contributions of VSUs to system and/or component utilization, and make decisions based thereon. For example, utilization scores may be sorted highest to lowest, or vice versa, for the system or one or more components, and other visual indicators, e.g., color, font, size, may be used to illustrate relative magnitude and/or categories. For example, the color red may be used to signify the a VSUs utilization surpassed a critical threshold, green to signify a VSU utilization is below a low threshold, and yellow to signify that a VSU utilization is between the critical and low threshold, i.e., within a moderate range.

It should be appreciated that performance information may be sorted independent of displaying such information. For example, utilization scores or other performance information may be sorted using any of a variety of known sorting algorithms, and other acts of methods 1200 and 1400 performed as a result of such sorting, without ever displaying the sorted information to the user.

FIG. 15 illustrates an example of how utilization information may be displayed to a user. Such utilization information may have been determined for a temporal period over which I/O operation information was gathered, and utilization scores determined. While FIG. 15 illustrates utilization information being displayed in tabular form 1500, the invention is not so limited. For example, information may be illustrated using in any suitable form, for example, using suitable graphs and charts. Further, much other information may be displayed along with the utilization information, for example, the identification of the subject data storage system and/or a specific view of the data storage system being displayed.

As shown in FIG. 15, a plurality of rows 1512 are displayed, each row corresponding to a respective VSU identified in column 1502. For each VSU corresponding to a row, utilization (i.e., "workload") values of the VSU for FA, BE, PSU and for the overall system may be displayed in columns 1504, 1506, 1508, and 1510, respectively, with row 1511 providing the corresponding labels for each column. Column 1512 may be used to display additional information for each VSU, for example, the average response time for a VSU or other performance metric value that was measured. While the collecting and aggregating of response time information and other performance information was not described in detail above, it should be appreciated that such information may be collected and aggregated for a VSU in a manner at least similar to as described above in relation to Act 1402, and other performance scores may be determined in a manner at least similar to as described above in relation to acts 1404-1408

While such display and visualization techniques may assist a user in assessing utilization, and making storage management decisions, it should be appreciated that, in some embodiments of the invention, such display—and any of a variety of other user interactions—are not necessary for performance of method 1300. That is, in some embodiments, method 1400 may be fully automated, such that no human interaction is necessary.

In act 1308, it may be determined whether to perform an action based at least in part on the quantified performances and determined impacts. Such determination may be made manually, based on performance and utilization information and scores conveyed to a user, or may be fully or partially automated; e.g., using encoded business logic rules. Such logic may encode various what-if scenarios, including, for example, defining conditions under which a certain action (e.g., migration, re-allocation, movement between tiers) will be performed, and/or defining the specifics of the action, e.g., which one or more VSUs of which data storage systems will be moved, migrated or have storage space re-allocated, and, for migration, what will be the target data storage system. In some embodiments, any of the what-if scenarios and related logic, techniques and mechanisms described in either of the following patents may be used, the contents of which are hereby incorporated by reference in their entirety: U.S. Pat. No. 7,292,969, titled "Method and System for Simulating Performance on One or More Data Storage Systems." issued Nov. 6, 2007; and U.S. Pat. No. 7,392,360, titled "Method and System for Capacity Planning and Configuring One or More Data Storage Systems," issued Jun. 24, 2008:

It should be appreciated that performance of act 1308 may determine that no further action is necessary such as, for example, in accordance with what-if logic. For example, the what-if logic or a user may determine not to take any further action if: the data storage system is not overloaded; the utilization scores of the data storage system and/or one or more functional components are within acceptable value ranges (e.g., less than predefined thresholds); the benefit of the contemplated migrations of VSUs or portions thereof, or re-allocations of storage space, are outweighed by the computation cost of migrating or re-allocating; other reasons; or any suitable combination of the foregoing. In such a case, method 1300 may end or return to act 1302, for example, at a next time at which method 1300 is to be performed.

In act 1310, data of the first VSU may be migrated from the first data storage system to the second data storage system. For example, an off-line or on-line (i.e., live) migration may be performed as described in U.S. Pat. No. 8,370,592, issued Feb. 5, 2013 (the '592 patent), the contents of which are hereby incorporated by reference in its entirety.

In summary, performing a live migration for a first virtual storage unit may include:
  creating a second virtual storage unit on the second data storage system;
  assigning a unique identifier of the first virtual storage unit to the second virtual storage unit, enabling the at least one host device to communicate concurrently with the first virtual storage unit and the second virtual storage unit;

placing the second virtual storage unit into a stalled-active mode in which responses to I/O operation requests received from a host system are delayed for up to a particular amount of time;

changing a mode of the first virtual storage unit from active mode, in which the first virtual storage unit is able to perform I/O operations, to passive mode in which the first virtual storage unit is not able to perform I/O operations;

changing a mode of the second virtual storage unit from the stalled-active mode to an active mode in which the first virtual storage unit is able to perform I/O operations; and copying the data from the first virtual storage unit to the second virtual storage unit.

Figure 16:
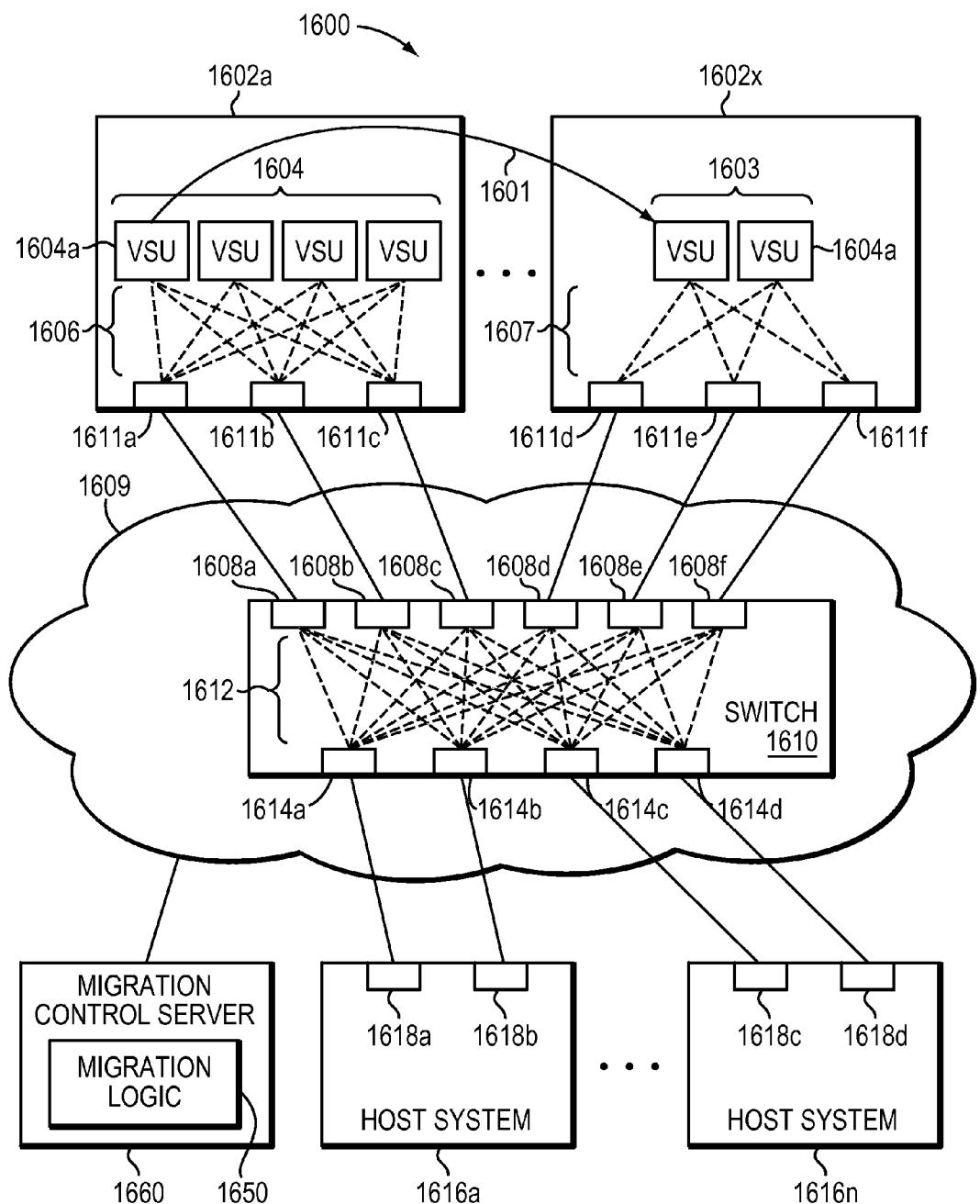
FIG. 16 (or just describe as table below) illustrates an example of a data structure for mapping VSUs to host device ports in accordance with some embodiments of the invention.

A more detailed example of how such migration may be performed is described in the '592 patent, in particular in relation to FIGS. 3a and 3b, and may be performed by migration server 1650 of FIG. 16. Migration server may include migration logic 1660 to control a performance of a live migration as described above and as described in the '592 patent. For example, migration server 1650 may be an embodiment of migration control server 28, show in GIG. 5 of the '592 patent, and described throughout.

In some embodiments, performance of the overall system or functional component thereof may be determined for a plurality of temporal intervals (e.g., X minutes) within a temporal period (e.g., Y hours or days), and the impact of one or more VSUs on performance (e.g., system and/or component utility scores) may be determined for a plurality of temporal intervals within a temporal period. Act 1310 may be scheduled to be performed for one or more VSUs based, at least in part, on the utility scores and performance values determined within particular periods. For example, the migration may be scheduled during a specific time of day, week or month that is anticipated as having low workload on the source and/or target data storage system. For example, the migration may be scheduled during a specific time of day, week or month for which the source and/or target data storage systems are anticipated as having low utilization based on the quantified performances of the source and target data storage systems during previously measured temporal intervals.

In act 1312, masking table(s) of source data storage system port(s) may be configured to disassociate the combination of the migrated VSU and such port(s) from the one or more host ports associated with the VSU, for example, as will now be described in relation to FIGS. 16 and 17.

FIG. 16 is a block diagram illustrating a system 1600 for which one or more aspects of the invention can be implemented, which will now be used to illustrate act 1312. System 1600 may include any of the following: a plurality of data storage systems, including 1602a and 1602x; a plurality of host systems, including host systems 1616a and 1616n, a communication network 1609 comprising one or more communication media segments, switch 1610 (e.g., a Connectrix from EMC), migration control server 1650, and any suitable combination of the foregoing. System 1600 may include, or be included as part of, system 10 described in relation to FIG. 1. Any of data storage systems 1602 may be an embodiment of a data storage system 10 described above in relation to FIG. 1, and any of host systems 1616 may be an embodiment of a host system 14 described above in relation to FIG. 1.

Switch 1610 may include switch storage ports 1608a-1609f, switch host ports 1614a-1614d and switch fabric 1612. Switch 1610 may be configured to enable communication between one or more switch storage ports 1608 and one or more switch host ports 1614 across switch fabric 1612. For example, a data structure (not shown) may define, for each switch storage port and/or switch host port, the one or more switch host ports and/or switch storage ports, respectively, with which communications are enabled. Each switch storage port 1608a-f may correspond to (e.g., may be dedicated to) a storage port 1611a-f, respectively, of data storage systems 1602a and 1602x, and each switch host port 1614a-d may correspond to (e.g., may be dedicated to) a host port 1618a-f, respectively, of host systems 1616a and 1616n. Thus, enabling communications between certain switch ports 1608 and 1614, enables communication between respective storage ports 1611 and host ports 1618. Enabling certain switch storage ports to communication with certain switch host ports (e.g., via a data structure), thereby enabling communication between certain switch ports and host ports is referred to herein as "zoning" or "mapping" storage ports to host ports.

Each of data storage systems 1602a and 1602x each may have data structures for associating a VSU 1604 with one or more storage ports 1611 and one or more host ports 1614, thereby enabling communication between the VSU and the host ports. Such data structure may be used to enable/disable the communications between VSUs of a data storage system and host ports of host system, and may be considered to define a communication "mask" between VSUs (and storage ports) and host ports.

FIG. 17 illustrates an example of a masking table 1700 that may be used in accordance with some embodiments of the invention, for associating a VSU and storage port with one or more host ports. For each data storage system (e.g., 1602a and 1602b), a masking table 1700 may be defined for each storage port 1611. Each entry in the masking table (e.g., 1708-1712) may represent a host port (which may be referred to as an initiator port). For each host port entry, a list of VSUs that are enabled to communicate to the host port are listed in VSU field 1704, and other information may be provided in one or more other information fields. For example, consider that masking table 1700 is defined for storage port 1611a. In such a case, entry 1708 specifies in column 1702 that it represents host port 1618a, and in column 1704 specifies that VSUs 1604a and 1604x (and perhaps others not shown) can communicate with host port 1618a through host port 1611a. While not shown in FIG. 17, the unique worldwide numbers (WWNs) of storage ports, host ports and/or VSUs may be used to identify these elements in FIG. 17.

If masking table 1700 of a storage port does not have an entry for a host port (e.g., no VSUs are mapped to the host port), or has a null entry for host port, then communication is not enabled between the storage port and host port. If masking table of a storage port has an entry for a host port, but column 1704 of the entry does not list a VSU, then communications between the VSU and the host port are not enabled through the storage port. It should be appreciated that other masking tables or data structures for associating and enabling communications between storage ports, host ports and VSUs may be maintained. For example, for a given data storage system, a single masking table may be defined for a plurality of (all) storage ports may be used, in which a first column of the masking table is an identifier of the storage port.

Prior to migration of a VSU, the switch and/or a port of the target system corresponding to the VSU may be configured such that communication between the VSU and the host device port is not enabled. For example, because the VSU resides on the source device, no masking tables of the target system may include an entry for the VSU. Further, the switch also may not be zoned to connect one or more ports of the second data storage system to the host port. As a result of the migration, communication between the host port and one or more ports of the source data storage system may be disabled, and communication between the host port and one or more ports of the source data storage system may be enabled (in part) by modifying the zoning/mapping scheme of the switch. However, there is often much administrative overhead and delay in modifying the zoning/mapping scheme of a switch.

Accordingly, in some embodiments of the invention, to avoid such overhead and delay, the switch (e.g., switch 1610) may be configured (e.g., on an ongoing basis) such that all host ports (e.g., 1618) connected to the switch can communicate with all storage ports (e.g., 1611) connected to the switch; and the communication paths necessitated by the migration may be enabled using the masking tables (e.g., 1700) of the source and target data storage systems, or other data structures. For example, if VSU 1604a is migrated from data storage system 1602a to 1602x, entry 1708 and 1710 of masking table 1700 may be modified to remove the listing of VSU 1604a, effectively disabling communication of 1604a to host ports 1618a and 1618b through storage port 1611a. Conversely, for a masking table of data storage system 1602x, an entry may be added to the masking table for 1611d, e or f, adding an entry for host port 1618a, which lists 1604a.

It should be noted that, in some embodiments of the invention, a masking table may be maintained at a certain logical storage level (e.g., LV level) different than the logical storage level at which VSUs are being migrated (e.g., SG level). In such a case, various other data structures may be employed to more efficiently re-mask a plurality or storage ports, host groups and/or VSUs. For example, data structures may be provided that group: LVs into SGs; storage ports into storage port groups; and host ports into host groups. If such data structures are available, modifying an entry for the entire SG, storage port group or host port group may automate changes to the corresponding masking tables of the underlying LVs, storage ports and host ports.

It may be desirable to mask ports in the manner described above to maintain a reduced number of communication paths between VSUs, storage ports and host ports, thereby reducing perceived size of the SAN from the perspective of one more functional components, and the necessary maintenance and computation required for the SAN, for example, in the event of a failure of one or more connections between host ports and storage ports.

It should be appreciated that method 1300 and/or 1400, and any individual acts of sub-acts thereof, for example, any of those describe herein, may be scheduled to be performed automatically and/or periodically, for example, on a recurring basis, e.g., to automatically optimize performance of one or more data storage systems within a computer system on a continual basis. Further, method 1300 and/or 1400, and any individual acts of sub-acts thereof, for example, any those describe herein, may be done automatically in response to an occurrence of one or more events such as, for example: the addition of a new data storage system to a computer system; the addition of more physical storage to one or more data storage systems of a computer system; the addition of VSU to a data storage system; the addition of a host system to a computer system, an addition of an application to a host system; the addition or rezoning of a switch; system initialization after a system failure; other events or any suitable combination of the foregoing. For example, after performance of act 1312, method 1300 may return to act 1302 at a predetermined time or in response to an event.

Methods, and acts thereof, described herein, various embodiments and variations of these methods and these acts and other methodologies and techniques described above, individually or in combination, may be defined by computer-readable signals tangibly embodied on one or more computer-readable media, for example, non-volatile recording media, integrated circuit memory elements, or a combination thereof. Computer readable media can be any available media that can be accessed by a computer. By way of example, and not limitation, computer readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EEPROM, flash memory or other semiconductor memory technology, CD-ROM, digital versatile disks (DVD) or other optical storage, magnetic cassettes, magnetic tape, magnetic disk storage or other magnetic storage devices, other types of volatile and non-volatile memory, any other medium which can be used to store the desired information and which can accessed by a computer, and any suitable combination of the foregoing.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, wireless media such as acoustic, RF, infrared and other wireless media, other types of communication media, and any suitable combination of the foregoing.

Computer-readable signals embodied on one or more computer-readable media may define instructions, for example, as part of one or more programs, that, as a result of being executed by a computer, instruct the computer to perform one or more of the functions described herein, and/or various embodiments, variations and combinations thereof. Such instructions may be written in any of a plurality of programming languages or scripts, for example, Java, J#, Visual Basic, C, C#, or C++, Perl, Fortran, Pascal, Eiffel, Basic, COBOL, etc., or any of a variety of combinations thereof. The computer-readable media on which such instructions are embodied may reside on one or more of the components of any systems described herein, may be distributed across one or more of such components, and may be in transition there between.

The computer-readable media may be transportable such that the instructions stored thereon can be loaded onto any computer system resource to implement the aspects of the present invention discussed herein. In addition, it should be appreciated that the instructions stored on the computer-readable medium, described above, are not limited to instructions embodied as part of an application program running on a host computer. Rather, the instructions may be embodied as any type of computer code (e.g., software or microcode) that can be employed to program a processor to implement the above-discussed aspects of the present invention.

It should be appreciated that any single component or collection of multiple components of a system, for example, any of the systems described herein, that perform the functions described herein can be generically considered as one or more controllers that control such functions. The one or more controllers can be implemented in numerous ways, such as with dedicated hardware and/or firmware, using a processor that is programmed using microcode or software to perform the functions recited above or any suitable combination of the foregoing.

Having now described some illustrative embodiments of the invention, it should be apparent to those skilled in the art that the foregoing is merely illustrative and not limiting, having been presented by way of example only. Numerous modifications and other illustrative embodiments are within the scope of one of ordinary skill in the art and are contemplated as falling within the scope of the invention. In particular, although many of the examples presented herein involve specific combinations of method acts or system elements, it should be understood that those acts and those elements may be combined in other ways to accomplish the same objectives. Acts, elements and features discussed only in connection with one embodiment are not intended to be excluded from a similar role in other embodiments.

Use of an ordinal term such as "first", "second", "third", etc., in the claims to modify a claim element does not by itself connote any priority, precedence, or order of one claim element over another or the temporal order in which acts of a method are performed, but are used merely as reference labels to distinguish one claim element (in a same or different claims) having a certain name from another element having a same name (but for use of the ordinal term) to distinguish the claim elements. Use of an ordinal label other than "first" before a claim element does not mean that the invention recited in the claim necessarily includes at least one other element of the same name. For example, recitation of a "second" "item" in a claim does not mean that the invention recited in the claim necessarily includes a first "item." Only recitation of a "first" "item" in the same claim or a claim from which the claim depends would necessarily make such element a part of the recited invention.

What is claimed is:

1. For a system comprising a first data storage system having a first plurality of virtual storage units, a second storage system having a second plurality of virtual storage units, and at least one host device connected to the first data storage system and the second data storage system, a method comprising:
    for at least a first virtual storage unit of the first plurality of virtual storage units, quantifying an impact on performance of the first data storage system by the at least first virtual storage unit, comprising:
        for a first functional component of the first data storage system, determining a first component utilization score indicative of a utilization of the first functional component by the first virtual storage unit;
        for a second functional component of the first data storage system, determining a second component utilization score indicative of a utilization of the second functional component by the first virtual storage unit; and
        combining the first and second component utilization scores to produce a utilization score for the first virtual storage unit indicative of an impact on performance of the first data storage system by the first virtual storage unit;
    determining whether to migrate data of the at least first virtual storage unit from the first data storage system to a second data storage system based at least in part on the quantified impact of the at least first virtual storage unit; and
    performing a migration of the data of the first virtual storage unit from the first data storage system to the second data storage system, wherein, concurrently to performance of the migration, the at least one host device maintains access to data of the first virtual storage unit.

2. The method of claim 1, wherein the at least one host device has at least a first host device port for communicating with at least the first data storage system, and the first data storage system comprises at least a first data storage system port to communicate with at least the first host device port, and wherein a first data structure associated with at least the first storage port includes an entry mapping at least the first host device port to at least the first virtual storage unit thereby enabling communication between at least the first host device port and the first virtual storage unit, and
    wherein the second data storage system comprises at least a second data storage system port to communicate with at least the first host device port, and a second data structure is associated with at least the second storage port, wherein the method further comprises:
    configuring the entry in the first data structure so that communication between the first virtual storage unit and at least the first host device port is disabled; and
    configuring an entry of the second data structure to enable communication between at least the first host device port and the migrated first virtual storage unit.

3. The method of claim 2, wherein the system comprises at least a first switch in a communication path between the first data storage system, the second data storage system and the at least first host device, the first switch comprising a plurality of host ports for communicating with a plurality of host device ports and a plurality of storage ports for communicating with a plurality of storage device ports of the first data storage system and the second data storage system, the method further comprising:
    configuring the switch so that communications are enabled between each of the plurality of host ports and each of the plurality of storage ports, thereby enabling communications between each of the plurality of host ports and each of the plurality of storage ports.

4. The method of claim 1, wherein quantifying the impact on performance comprises, for each of the first plurality of virtual storage units, quantifying the impact on performance of the data storage system by the virtual storage unit, and
    wherein determining whether to migrate comprises selecting the at least first virtual storage unit from among the first plurality of virtual storage units for which to migrate the data to the second data storage system based at least in part on the quantified impacts.

5. The method of claim 1, wherein the second data storage system has at least a second virtual storage unit, the method further comprising acts of:
    for at least the second virtual storage unit, quantifying an impact on performance of the second data storage system by the at least second virtual storage unit, and
    wherein determining whether to migrate comprises determining whether to migrate data of the at least first virtual storage unit from the first data storage system to the second data storage system based at least in part on the quantified impact of the at least second virtual storage unit.

6. The method of claim 1, wherein the act of quantifying a performance of the first virtual storage unit comprises quantifying a performance of the first virtual storage unit during a plurality of temporal intervals over a temporal period to produce interval performance values, and wherein the act of performing a migration comprises performing the migration during a particular temporal interval based at least in part on the interval performance values.

7. The method of claim 1, wherein the first virtual storage unit has a unique identifier, and wherein performing the migration comprises:

creating a second virtual storage unit on the second data storage system;

assigning a same unique identifier to the second virtual storage unit, enabling the at least one host device to communicate concurrently with the first virtual storage unit and the second virtual storage unit;

placing the second virtual storage unit into a stalled-active mode in which responses to I/O operation requests received from a host system are delayed for up to a particular amount of time;

changing a mode of the first virtual storage unit from active mode, in which the first virtual storage unit is able to perform I/O operations, to passive mode in which the first virtual storage unit is not able to perform I/O operations;

changing a mode of the second virtual storage unit from the stalled active mode to an active mode in which the second virtual storage unit is able to perform I/O operations; and copying the data from the first virtual storage unit to the second virtual storage unit.

8. The method of claim 1, wherein quantifying the impact of at least the first virtual storage unit comprises:

for at least one of the first and second functional components, for a plurality of types of storage I/O operations, counting a number of occurrences of the storage I/O operation type over a period of time to produce an I/O operation type count value for the at least first virtual storage unit for the at least one functional component; and combining the I/O operation type count values.

9. For a computer system comprising a first data storage system having a first plurality of virtual storage units, a second storage system having a second plurality of virtual storage units, and at least one host device connected to the first data storage system and the second data storage system, a system comprising:

first logic to quantify, for at least a first virtual storage unit of the first plurality of virtual storage units, an impact on performance of the first data storage system by the at least first virtual storage unit, the first logic comprising:

logic to determine, for a first functional component of the first data storage system, a first component utilization score indicative of a utilization of the first functional component by the first virtual storage unit;

logic to determine, for a second functional component of the first data storage system, a second component utilization score indicative of a utilization of the second functional component by the first virtual storage unit; and logic to combine the first and second component utilization scores to produce a utilization score for the first virtual storage unit indicative of an impact on performance of the first data storage system by the first virtual storage unit;

second logic to determine whether to migrate data of the at least first virtual storage unit from the first data storage system to a second data storage system based at least in part on the quantified impact of the at least first virtual storage unit; and third logic to perform a migration of the data of the first virtual storage unit from the first data storage system to the second data storage system, wherein, concurrently to performance of the migration, the at least one host device maintains access to data of the first virtual storage unit.

10. The system of claim 9, wherein the at least one host device has at least a first host device port for communicating with at least the first data storage system, and the first data storage system comprises at least a first data storage system port to communicate with at least the first host device port, and wherein a first data structure associated with at least the first storage port includes an entry mapping at least the first host device port to at least the first virtual storage unit thereby enabling communication between at least the first host device port and the first virtual storage unit, and wherein the second data storage system comprises at least a second data storage system port to communicate with at least the first host device port, and a second data structure is associated with at least the second storage port, wherein the system further comprises:

fourth logic to configure the entry in the first data structure so that communication between the first virtual storage unit and at least the first host device port is disabled; and fifth logic to configure an entry of the second data structure to enable communication between at least the first host device port and the migrated first virtual storage unit.

11. The system of claim 10, wherein the computer system comprises at least a first switch in a communication path between the first data storage system, the second data storage system and the at least first host device, the first switch comprising a plurality of host ports for communicating with a plurality of host device ports and a plurality of storage ports for communicating with a plurality of storage device ports of the first data storage system and the second data storage system, the system further comprising:

sixth logic to configure the switch so that communications are enabled between each of the plurality of host ports and each of the plurality of storage ports, thereby enabling communications between each of the plurality host ports and each of the plurality of storage ports.

12. The system of claim 9, wherein the first logic comprises logic to quantify, for each of the first plurality of virtual storage units, the impact on performance of the data storage system by the virtual storage unit, and wherein the second logic comprises logic to select the at least first virtual storage unit from among the first plurality of virtual storage units for which to migrate the data to the second data storage system based at least in part on the quantified impacts.

13. The system of claim 9, wherein the second data storage system has at least a second virtual storage unit, wherein the first logic comprises logic to quantify, for at least the second virtual, an impact on performance of the second data storage system by the at least second virtual storage unit, and wherein the second logic comprises logic to determine whether to migrate data of the at least first virtual storage unit from the first data storage system to the second data storage system based at least in part on the quantified impact of the at least second virtual storage unit.

14. The system of claim 9, wherein the first logic comprises logic to quantify a performance of the first virtual storage unit during a plurality of temporal intervals over a temporal period to produce interval performance values, and
wherein the third logic includes logic to schedule performance of the migration during a particular temporal interval based at least in part on the interval performance values.

15. The system of claim 9, wherein the first virtual storage unit has a unique identifier, and wherein the third logic comprises logic to control:
creating a second virtual storage unit on the second data storage system;
assigning a same unique identifier to the second virtual storage unit, enabling the at least one host device to communicate concurrently with the first virtual storage unit and the second virtual storage unit;
placing the second virtual storage unit into a stalled-active mode in which responses to I/O operation requests received from a host system are delayed for up to a particular amount of time;
changing a mode of the first virtual storage unit from active mode, in which the first virtual storage unit is able to perform I/O operations, to passive mode in which the first virtual storage unit is not able to perform I/O operations;
changing a mode of the second virtual storage unit from the stalled active mode to an active mode in which the second virtual storage unit is able to perform I/O operations; and
copying the data from the first virtual storage unit to the second virtual storage unit.

16. The system of claim 9, wherein the first logic comprises logic to:
count, for at least one of the first and second functional components, for a plurality of types of storage I/O operations, a number of occurrences of the storage I/O operation type over a period of time to produce an I/O operation type count value for the at least first virtual storage unit for the at least one functional component; and
combine the I/O operation type count values.

17. A non-transitory computer-readable storage device encoded with computer-executable instructions that, as a result of being executed by a computer, control the computer to perform, for a system comprising a first data storage system having a first plurality of virtual storage units, a second storage system having a second plurality of virtual storage units, and at least one host device connected to the first data storage system and the second data storage system, a method comprising:
for at least a first virtual storage unit of the first plurality of virtual storage units, quantifying an impact on performance of the first data storage system by the at least first virtual storage unit, comprising:
for a first functional component of the first data storage system, determining a first component utilization score indicative of a utilization of the first functional component by the first virtual storage unit;
for a second functional component of the first data storage system, determining a second component utilization score indicative of a utilization of the second functional component by the first virtual storage unit; and
combining the first and second component utilization scores to produce a utilization score for the first virtual storage unit indicative of an impact on performance of the first data storage system by the first virtual storage unit;
determining whether to migrate data of the at least first virtual storage unit from the first data storage system to a second data storage system based at least in part on the quantified impact of the at least first virtual storage unit; and
performing a migration of the data of the first virtual storage unit from the first data storage system to the second data storage system, wherein, concurrently to performance of the migration, the at least one host device maintains access to data of the first virtual storage unit.

18. The computer-readable storage device of claim 17, wherein the at least one host device has at least a first host device port for communicating with at least the first data storage system, and the first data storage system comprises at least a first data storage system port to communicate with at least the first host device port, and wherein a first data structure associated with at least the first storage port includes an entry mapping at least the first host device port to at least the first virtual storage unit thereby enabling communication between at least the first host device port and the first virtual storage unit, and
wherein the second data storage system comprises at least a second data storage system port to communicate with at least the first host device port, and a second data structure is associated with at least the second storage port, wherein the method further comprises:
configuring the entry in the first data structure so that communication between the first virtual storage unit and at least the first host device port is disabled; and
configuring an entry of the second data structure to enable communication between at least the first host device port and the migrated first virtual storage unit.

19. The computer-readable storage device of claim 18, wherein the system comprises at least a first switch in a communication path between the first data storage system, the second data storage system and the at least first host device, the first switch comprising a plurality of host ports for communicating with a plurality of host device ports and a plurality of storage ports for communicating with a plurality of storage device ports of the first data storage system and the second data storage system, the method further comprising:
configuring the switch so that communications are enabled between each of the plurality of host ports and each of the plurality of storage ports, thereby enabling communications between each of the plurality host ports and each of the plurality of storage ports.

20. The computer-readable storage device of claim 17, wherein quantifying the impact on performance comprises, for each of the first plurality of virtual storage units, quantifying the impact on performance of the data storage system by the virtual storage unit, and
wherein determining whether to migrate comprises selecting the at least first virtual storage unit from among the first plurality of virtual storage units for which to migrate the data to the second data storage system based at least in part on the quantified impacts.

* * * * *